(12) United States Patent
Taki et al.

(10) Patent No.: US 9,919,223 B2
(45) Date of Patent: Mar. 20, 2018

(54) SYSTEM FOR ASSESSING LIFE AND DEATH IN GAMES OF GO

(71) Applicant: PANDANET INC., Chiyoda-ku, Tokyo (JP)

(72) Inventors: Hiroko Taki, Tokyo (JP); Tomoya Saeki, Tokyo (JP); Hiroshi Oomoto, Funabashi (JP)

(73) Assignee: PANDANET INC., Tokyo (JP)

( * ) Notice: Subject to any disclaimer, the term of this patent is extended or adjusted under 35 U.S.C. 154(b) by 0 days.

(21) Appl. No.: 15/375,391

(22) Filed: Dec. 12, 2016

(65) Prior Publication Data

US 2017/0120153 A1 May 4, 2017

Related U.S. Application Data

(63) Continuation of application No. 13/995,600, filed as application No. PCT/JP2010/072851 on Dec. 20, 2010, now abandoned.

(51) Int. Cl.
*A63F 13/46* (2014.01)
*A63F 13/80* (2014.01)
(Continued)

(52) U.S. Cl.
CPC .......... *A63F 13/80* (2014.09); *A63F 3/00643* (2013.01); *A63F 13/46* (2014.09);
(Continued)

(58) Field of Classification Search
CPC .......... A63F 13/10; A63F 13/12; A63F 13/46; A63F 13/79; A63F 13/85; A63F 13/822
See application file for complete search history.

(56) References Cited

U.S. PATENT DOCUMENTS

2012/0322525 A1  12/2012  Taki et al.

FOREIGN PATENT DOCUMENTS

JP  06-126021 A   5/1994
JP  10-272259 A  10/1998
(Continued)

OTHER PUBLICATIONS

"GoTools Online UI". From lie.math.brocku.ca via The Way Back Machine (www.archive.org). [dated Jun. 19, 2010]. [online], [retrieved on Mar. 9, 2015]. Retrieved from the Internet <URL: https://web.archive.org/web/20100619040700/http://lie.math.brocku.ca/GoTools/applet.html>. 1 page.*
(Continued)

*Primary Examiner* — Lawrence Galka
(74) *Attorney, Agent, or Firm* — Bruzga & Associates; Charles E. Bruzga; Shlomo S. Moshen

(57) ABSTRACT

A system is for assessing life and death in go games played on a computer, and includes an input-receiving unit for receiving input from a player, an assessment unit that assesses the life and death of target stones, and an output unit for outputting the results of the assessment in the assessment unit. The assessment unit receives input specifying one or more target stones, specifies the points on the board where a boundary and a board edge are within a prescribed distance from each other, revises the assessment area by expanding the assessment area, assesses an optional stone in the post-revision assessment area to be alive if said stone escapes and was a target stone, and if said stone was not a target stone, performs a life and death assessment after adding the condition that said stone is not captured and a target stone connected to said stone is alive.

2 Claims, 21 Drawing Sheets

(51) Int. Cl.
*A63F 13/822* (2014.01)
*A63F 3/00* (2006.01)
*A63F 9/24* (2006.01)

(52) U.S. Cl.
CPC ...... *A63F 13/822* (2014.09); *A63F 2003/007* (2013.01); *A63F 2009/2486* (2013.01); *A63F 2300/807* (2013.01)

(56) References Cited

FOREIGN PATENT DOCUMENTS

| JP | 11-226262 A | 8/1999 |
| JP | 2001-276299 A | 10/2001 |
| JP | 2002-292126 A | 10/2002 |
| JP | 2003-047770 A | 2/2003 |

OTHER PUBLICATIONS

"GoTools Online Howto". From lie.math.brocku.ca [online], [retrieved on Mar. 9, 2015]. Retrieved from the Internet <URL:http://lie.math.brocku.ca/gotools/goToolsBoard/helpmsg_en.html>. 2 pages.*

Shinichi Sei, et al., "Introduction to Computer Go", Kyoritsu Shuppan Co., Ltd., Nov. 10, 2005, pp. 103-110, 114-115.*

Kabushiki Kaisha Pandanet, "Jissen Igo 'life and death navi," (Aug. 2003) [online], Internet <URL: http://www.pandanel.co.jp/members/lifedeath/index.html>.

Thomas Wolf, "Go Tools", (May 29, 2008) [online], Internet <URL: http://lie.math.brocku.ca/gotools/>.

"Tsumego 'Don", (Sep. 20, 2002) [online], Internet <URL: http://hp.vector.eo.jp/authorsNA024708/>.

Nippon Computer Igo Kyokai, "Igo Program", (Dec. 12, 2006) [online], Internet <URL: http://http://www.geocities.ip/otto4yoshi/jcga/indexkp.html>.

Kato, H., Yamazaki, K., "Jirei wo Mochiita Computer 9 Roban Igo ni Okeru Shikatsu Hanlei" vol. 53 (latter part of 1996), Zenkoku Taikai Koen Ronbunshu (2), JP, Information Processing Society of Japan, Sep. 4, 1996, 2-145 to 2-146.

Masato Fukui et al., "Evaluation Function in Middle Game of Go", IPSJ SIG Notes, Aug. 4, 2003, vol. 2003, No. 79 p. 47 to 54.

Hyu-Soo Park et al., Implementation of State Evaluation using Group area and String Safety in Computer Baduk, Korea Information Science Society Conference, Apr. 1996, 217-220, vol. 23 No. 1A, Korea Information Science, http://www.dbpia.co.kr/Journal/ArticleDetail/NODE00624511.

International Preliminary Report on Patentability of PCT/JP2010/072851 dated Jun. 25, 2013.

* cited by examiner

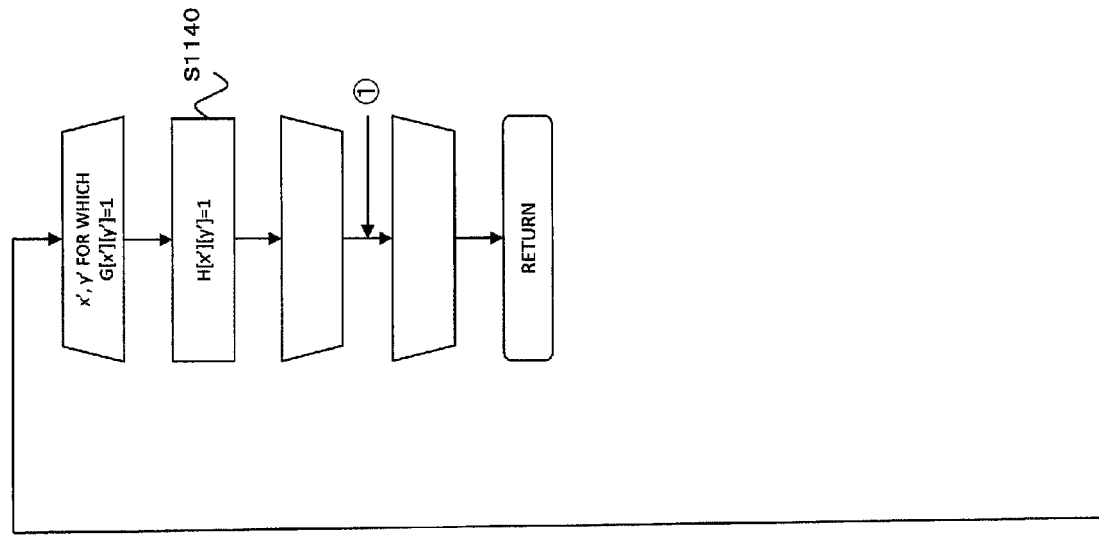
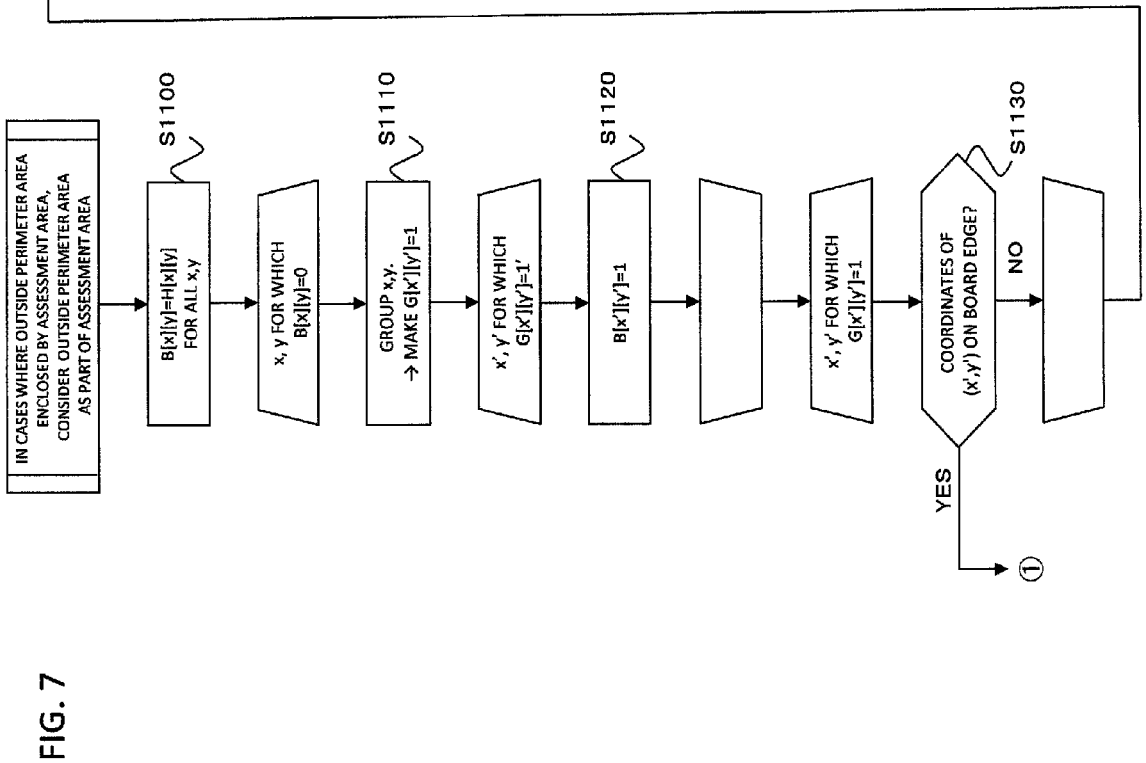
FIG. 7

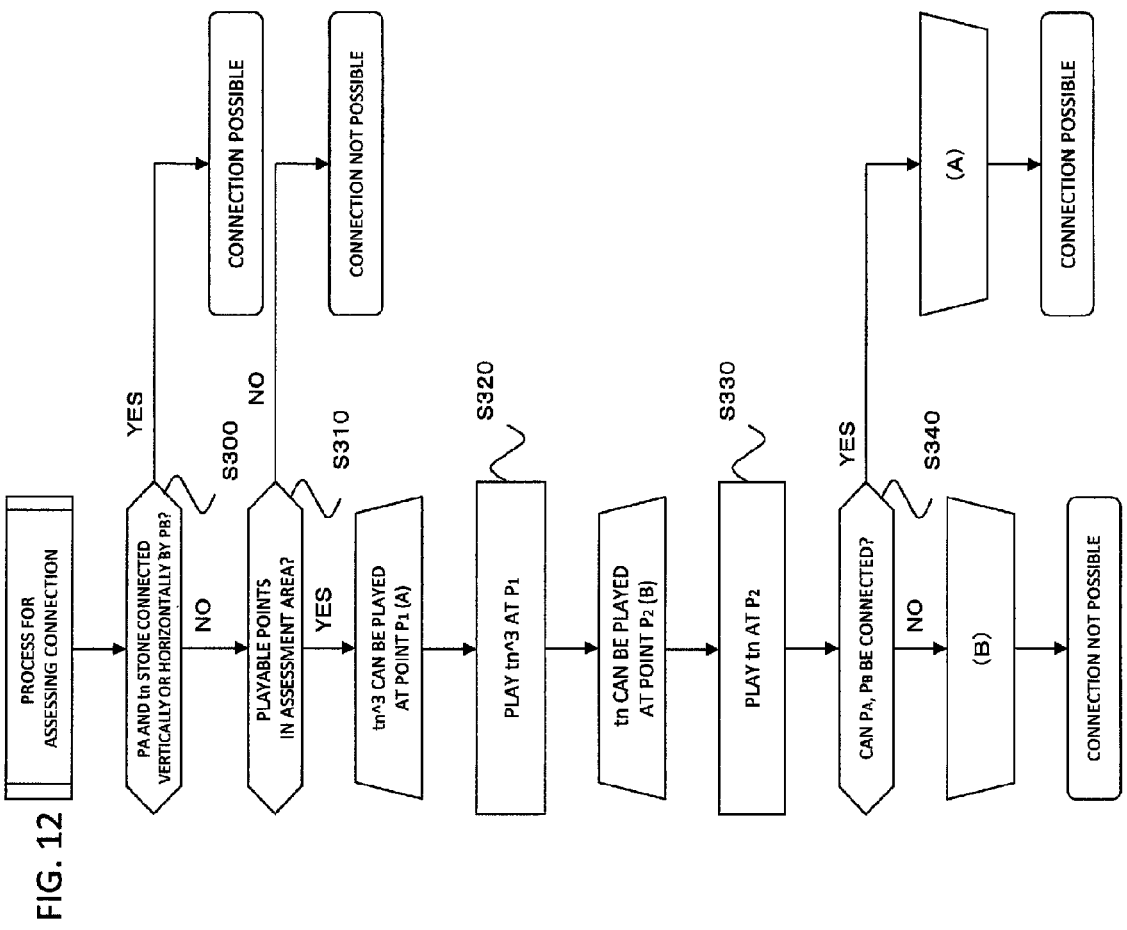

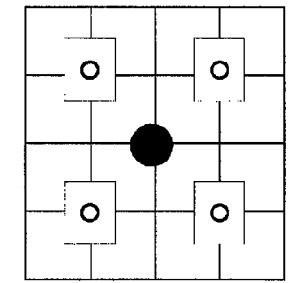
FIG. 15
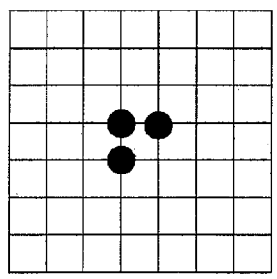
FIG. 14
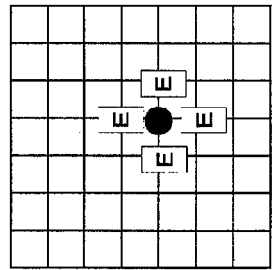
E POINTS DETERMINED FOR EACH STONE.
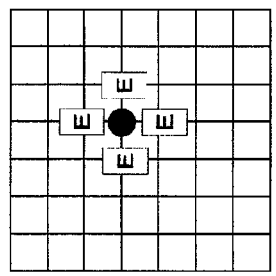
TOTAL COLLECTION OF E POINTS FOR EACH STONE DETERMINED.
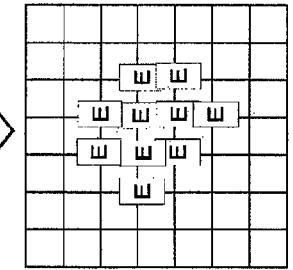
REMOVE PORTION OF E POINTS AT WHICH STONES ARE PRESENT FROM TOTAL COLLECTION OF E POINTS FOR EACH STONE. REMAINING ARE E POINTS OF THE THREE BLACK STONES.

FIG. 16
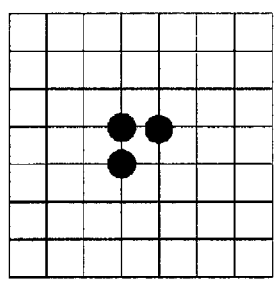
⇒ O POINTS DETERMINED FOR EACH STONE.
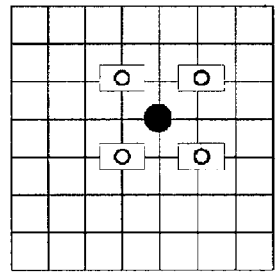
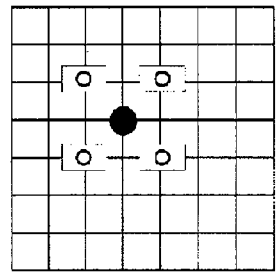
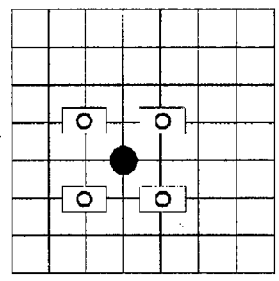
⇒ TOTAL COLLECTION OF O POINTS FOR EACH STONE DETERMINED.
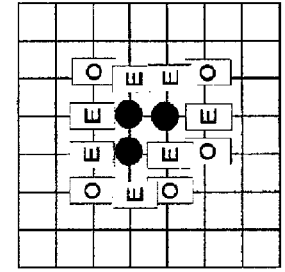
⇑ FINALLY, REMOVE ALL POINTS INCLUDED IN E POINTS FOR EACH STONE. REMAINING 5 POINTS ARE O POINTS OF THE THREE BLACK STONES.
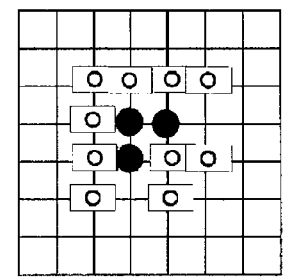
⇑ REMOVE PORTION OF O POINTS AT WHICH STONES ARE PRESENT FROM TOTAL COLLECTION OF O POINTS FOR EACH STONE.
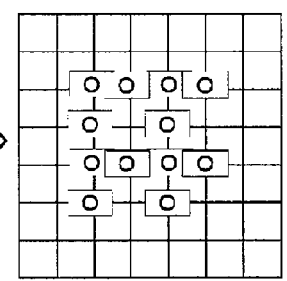

EMPTY E POINTS AND EMPTY O POINTS OF THE THREE BLACK STONES ARE E AND O RESPECTIVELY.

SYSTEM FOR ASSESSING LIFE AND DEATH IN GAMES OF GO

TECHNICAL FIELD

The present invention relates to a system for assessing life and death in games of Go played using a computer.

BACKGROUND ART

On a computer, a user can play a game of Go with a computer or another user via a network. Go is a game in which players compete over the size of territory, and it is important that the player establishes a strategy and makes moves while constantly considering how to keep the player's own stones alive and how to kill the opponent's stones in a given situation.

For example, if the player can judge that the player's own stones are dead at an early stage, the player can abandon that territory and concentrate on another location, which is also very efficient as an overall strategy. For this reason, it is extremely important in Go to determine whether one's own stones or the opponent's stones are alive or dead. The question of whether stones are alive or dead is referred to as "life and death." Living stones are those that cannot be captured by the opponent's moves or that, if captured, produce stones that cannot be captured again by the opponent. Dead stones are those other than living stones and that can be captured by the opponent's moves.

In addition to playing a role in strategy during a game of Go, the life and death of stones must also foe judged at the end of the game. The life or death of stones is also important from this standpoint. For this reason, there also exist sets of problems, called tsumego, for solving localized cases of life and death.

Assessing the life or death of stones is thus extremely important in Go, but actually assessing whether stones are alive or dead is not easy. In particular, computers have difficulty doing so automatically. Accordingly, systems for performing processes associated with the life and death of stones have been disclosed, as in, e.g. the following Patent Documents and Non-Patent Documents.

PRIOR ART DOCUMENTS

Patent Documents

Patent Document 1: Japanese Laid-open Patent Application No. 6-126021.
Patent Document 2: Japanese Laid-open Patent Application No. 10-272259.
Patent Document 3: Japanese Laid-open Patent Application No. 11-226262.
Patent Document 4: Japanese Laid-open Patent Application No. 2002-292126.

Non-Patent Documents

Non-Patent Document 1: Kabushiki Eaisha Pandanet, "Jissen Igo 'life and death navi'", [online], Internet <URL: http://www.pandanet.co.jp/members/lifedeath/index.html>.
Non-Patent Document 2: Thomas Wolf, "GoTools", [online], Internet <URL: http://lie.math.brocku.ca/gotools/>.
Non-Patent Document 3: "Tsumego 'Don'", [online], Internet CURL: http://hp.vector.co.jp/authors/VA024708/>
Non-Patent Document 4: Nippon Computer Igo Eyokai, "Igo Program", [online], Internet <URL: http://www.geocities.jp/otto4yoshi/jcga/indexkp.hfcml>.
Non-patent document 5: KATO, H., YAMAZAKI K., "Jirei wo Mochiita Computer 9 Roban Igo ni Okeru Shikatsu Hantei" Vol. 53 (latter part of 1996), Zenkoku Taikai Koen Ronbunshu (2), JP, Information Processing Society of Japan, 4 Sep. 1996, 2-145 to 2-146
Non-Patent Document 6: Computer Igo no Nyumon, J P, Kyoritsu Shuppan K. K., 10 Nov. 2005, First ed., p. 108-110, 114-115

DISCLOSURE OF THE INVENTION

Problems to be Solved by the Invention

Although the system described in Patent Document 1 performs processes associated with the life and death of stones, the system is such that when a player designates dead stones, designating one stone allows a group of stones adjacent to that stone to toe also designated as dead. Therefore, simply by designating one stone, a player can designate a group of stones as dead without designating the surrounding stones, and therefore the processes by which the player designates dead stones can be reduced. However, the player must judge the life and death of the stones, and the system cannot automatically assess life and death.

The system described in Patent Document 2 can manage the stones placed on the board as well as their characteristics. For example, the system can manage the links between stones placed on the board and can manage which stones constitute a group. The system can therefore manage the stones on the board as well as the arrangement thereof, and assess when stones formed in a simple pattern are alive (e.g., the presence of two eyes represents being alive). However, the system can only assess very simple patterns and cannot be relied upon for use in actual games.

The system described in Patent Document 3 can assess in the middle of a game whether stones that have already been placed on the board are strong or weak in the context of Go, Stones being strong or weak in the context of Go means that, if the region outside of certain stones is surrounded, the stones are weak, if the region outside of certain stones is not surrounded, the stones are strong. In the case of this system, whether the stones are strong or weak is assessed by the number of stones of a different color placed around (within four spaces of) the stones. However, the system can only determine whether the stone is strong or weak in the context of go and does not assess the life and death of the stones.

The system described in Patent Document 4 automatically assesses the life and death of stones at the end of a game of Go. This system assumes that the game has ended, i.e., that the territories (enclosed regions) have already been established, and then merely performs a simplified assessment of life and death. The system therefore cannot assess life and death in states other than the end of the game, i.e., while playing, and furthermore, even in the endgame, the system can only assess the life and death of a limited number of patterns.

As described above, the processes associated with life and death described in the aforedescribed Patent Documents do not necessarily provide exceptional assessments of life and death.

Besides the systems for assessing life and death described in the aforedescribed Patent Documents, other systems for using a computer to assess the life and death of stones exist, as described in the Non-Patent Documents. For example, methods exist in which a number of patterns of problem diagrams, solution diagrams, and predicted failure diagrams are stored in advance, and assessments are made through matches with these diagrams.

In this case, the assessment cannot be made if an unexpected move is made, and storing many patterns of problem diagrams, correct-answer diagrams, and expected-failure diagrams is not preferable in light of problems of memory capacity.

In cases in which the aforementioned Patent Documents, Non-Patent Documents, or [other] existing systems for assessing life and death in games of go are employed, the outside perimeter must include a single color, either white or black. Localized assessment of life and death is crucial in Go, and this requirement was based on the premise that, for a computer to make such assessments, stones to be assessed for life and death must be in a state such that the stones cannot escape (connect to the outside perimeter), i.e., the outside perimeter is a single color. In cases in which the outside perimeter includes both colors white and black, the process for assessing life and death must therefore be made after transforming the board such that the outside perimeter is a single color.

However, the likelihood of being able to automatically transform the board is not high. Meanwhile, for a user to manually transform the board would require knowledge of Go, and as such could not be readily performed by just anyone.

For example, in a case in which the board to be assessed for life and death is that in FIG. 21, the outside perimeter includes stones of both white and black color, and unless transformed by the user or automatically so that the outside perimeter is a single color of white stones, as shown in, e.g., FIG. 22, the assessment could not be made in a conventional system for assessing life and death.

Even assuming that transformation of the board could be automated, or that a user could transform the board manually, life and death assessments can only be performed in oases in which the outside perimeter is a single color, and so versatility is lacking. In particular, in many instances in which life and death assessments are performed on a board during play, both white and black are included in the outside perimeter. The ability to use a computer to assess life and death even in cases where both white and black are included in the outside perimeter is therefore needed.

Means Used to Solve the Above-Mentioned Problems

In light of the aforementioned problems, there is provided in the invention of the present application a system for assessing life and death in games of Go, in which life and death can be assessed even in cases where both white stones and black stones are included in an outside perimeter.

The invention of a first aspect is a system for assessing life and death in a game of go, the system for assessing life and death comprising an input-receiving unit for receiving input from a player; an assessment unit for assessing whether a target stone is alive or dead; and an output unit for outputting a result of a life and death assessment in the assessment unit, the assessment unit receiving input designating at least one of the target stones; specifying points on a board where an outside perimeter and a board edge are separated by no more than a predetermined distance, and expanding an assessment area in a direction of an outside perimeter area according to the distance of separation, thereby revising the assessment area; and performing, when any stone in the revised assessment area has escaped, an assessment of the stone as being alive in cases where the stone is a target stone, or, in cases where the stone is not a target stone, executing a process for assessing life and death in which a condition is added that the target stone linked to the stone is alive, where the stone is considered to be uncapturable.

Providing a process for cases corresponding to escape from an outside perimeter, as in the invention of the present application, allows life and death to be assessed even in cases in which both white and black are included in the outside perimeter. A highly versatile system for assessing life and death is thereby possible.

In the aforedescribed invention, processes such as described below can improve accuracy. Specifically, the assessment unit specifies the points on the board where the outside perimeter and the board edge are separated by no more than the predetermined distance, expands the assessment area in the direction of the outside perimeter area according to the distance of separation, and, in the case in which the expanded points were already included in the assessment area, designates the outside perimeter area thereby enclosed in the assessment area as part of the assessment area, whereby the assessment area is revised; and performs, when any stone in the revised assessment area has escaped, an assessment of the stone as being alive in cases where the stone is a target stone or, in cases where the stone is not a target stone, executes a process for assessing life and death in which a condition is added that the target stone connected to the stone is alive, where the stone is considered to be uncapturable.

Life and death assessments are conventionally performed by computer in cases of an outside perimeter at a single location. Therefore, in cases of outside perimeters at two or more locations, life and death cannot be assessed without revision to produce an outside perimeter at a single location. For example, in a case in which the board to be assessed for life and death is that in FIG. 23, the outside perimeter is divided between two locations. Therefore, without transforming into an outside perimeter at a single location, as in, e.g., FIG. 24, either automatically or by the user, the assessment cannot be made in a conventional system for assessing life and death.

However, as in the case of an outside perimeter with two colors, there are many cases in which an outside perimeter is present in multiple areas on the board of a game of Go, and it would be desirable to employ a system for assessing life and death in such cases as well. Employing the present invention accordingly also allows handling of an outside perimeter including two or more locations.

In the case of an outside perimeter at a single location, i.e., an outside perimeter area at a single location, only one group of stones serves as the outside perimeter, and thus the number of points of possible escape is at most two. However, in cases in which there are outside perimeters at multiple locations, the settings for the assessment area must be revised during the process for assessing life and death so that the number of points of possible escape is three or more. In contrast, escape may in principle be viewed as living in the context of Go, but successful escape does not mean that [the stones] will necessarily live in cases where an area further towards the outside is surrounded by opposing stones. However, in cases where the board edge is vacant, such a condition is unlikely to arise, so there is no problem with viewing [the stones] as being alive. Thus, it is considered easier for stones to live upon escaping to an outside perimeter.

Accordingly, as in the present invention, a possibility of failure to live exists for areas where the outside perimeter is enclosed, and the board edge is not open. Including regions enclosed by an outside perimeter in the assessment area therefore allows accuracy to be increased.

Causing a computer to read and execute a computer program of the present invention allows a first invention to be configured. In other words, a configuration can be used in which there is provided a program for assessing life and death in a game of Go, the program causing a computer to act as an input-receiving unit for receiving input from a player; an assessment unit for assessing whether a target stone is alive or dead; and an output unit for outputting a result of a life and death assessment in the assessment unit, wherein the assessment unit receives input designating at least one of the target stones; specifies points on a board where an outside perimeter and a board edge are separated by no more than a predetermined distance, and expands an assessment area in a direction of an outside perimeter area according to the distance of separation, thereby revising the assessment area; and performs, when any stone in the revised assessment area has escaped, an assessment of the stone as being alive in cases where the stone is a target stone, or, in cases where the stone is not a target stone, executes a process for assessing life and death in which a condition is added that the target stone linked to the stone is alive, where the stone is considered to be uncapturable.

Effect of the Invention

The system for assessing life and death in a game of Go of the present invention can assess life and death even in cases where an outside perimeter includes both white and black stones. The number of cases in which assessments of life and death can be performed is thereby greater than in the prior art.

BRIEF DESCRIPTION OF THE DRAWINGS

FIG. 7 schematically shows an example of a flow chart of a case in the process for revising the assessment area where part or all of the outside-perimeter area is considered as [part of] the assessment area;

FIG. 12 schematically shows an example of a flow chart of the process for assessing connection;

FIG. 13 shows the E points;

FIG. 14 shows the process for determining the S points of a group of a plurality of stones;

FIG. 15 shows the O points;

FIG. 16 shows the process for determining the O points of a group of a plurality of stones;

FIG. 13 shows an example of a game screen;

BEST MODE FOR CARRYING OUT THE INVENTION

A system 1 for assessing life and death in a game of Go of the present invention (hereinafter simply referred to as the "life-and-death assessment system 1") can be employed for a Go-playing system run through the Internet or another network, or for a Go-playing system not run through a network. Note that the present specification describes cases in which a playing system is employed simultaneously with the life-and-death assessing system 1, but the life-and-death assessing system 1 may also function alone. The same processes can also be performed in such instances.

Figure 1:
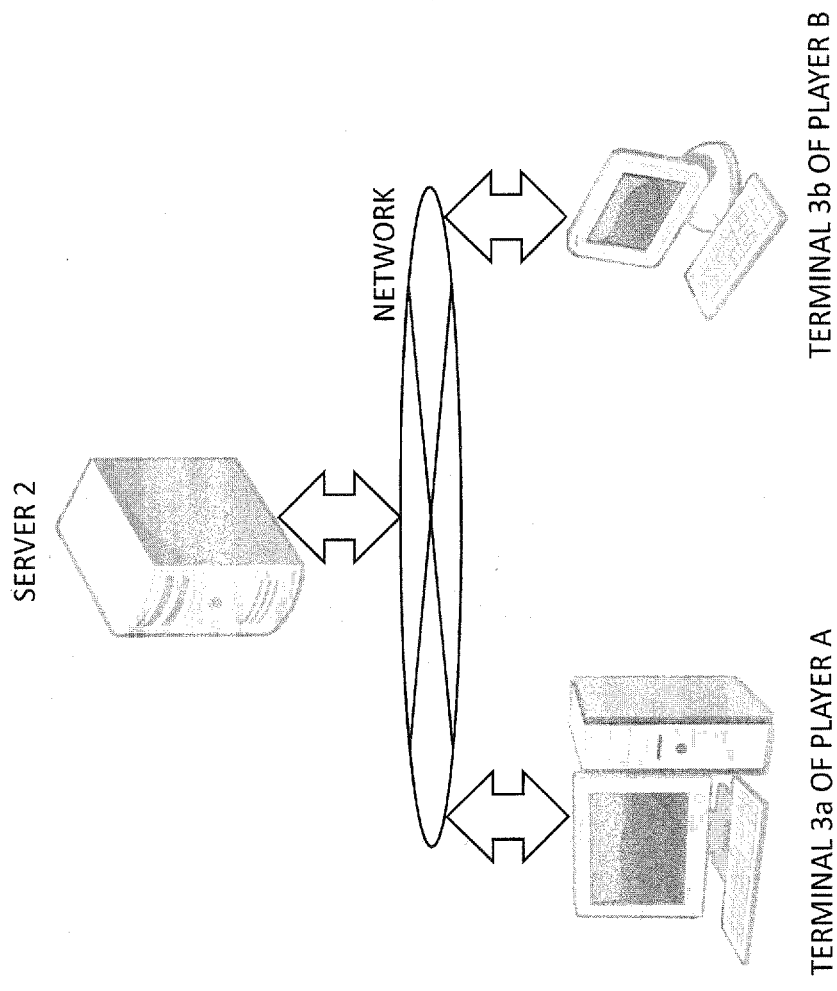
FIG. 1 schematically shows an example configuration of a case where a game of Go is implemented through a network.

An example of the configuration for a Go-playing system run through a network and provided with the life-and-death assessing system 1 of the present invention is shown schematically in FIG. 1. In this case, information can be transmitted and received through the network between computers (player terminals 3), which are used by the players, and a server 2 for implementing the playing system. The present specification gives a case in which the processes for the playing system and the life and death assessing system 1 are executed in the same server 2, but the processes may also be executed in different servers 2. As described above, in addition to the fact that the playing system is implemented by the server 2, the playing system provided with the life-and-death assessing system 1 can also be provided to the player terminals 3, whereby the processing associated with the present invention may also be executed without going through a network. Furthermore, the life-and-death assessing system 1 of the present invention may also be incorporated as a function of the playing system, and integrally configured therewith.

Besides the server 2, the life and death assessing system 1 and the playing system may also be [run on] a personal computer terminal, cellular phone, PHS, PDA, smartphone, or other portable communication terminal. The player terminals 3 may also be portable communication terminals. The server 2, personal computer terminal, portable terminal, and the like will be referred to by the generic term "computer."

Figure 2:
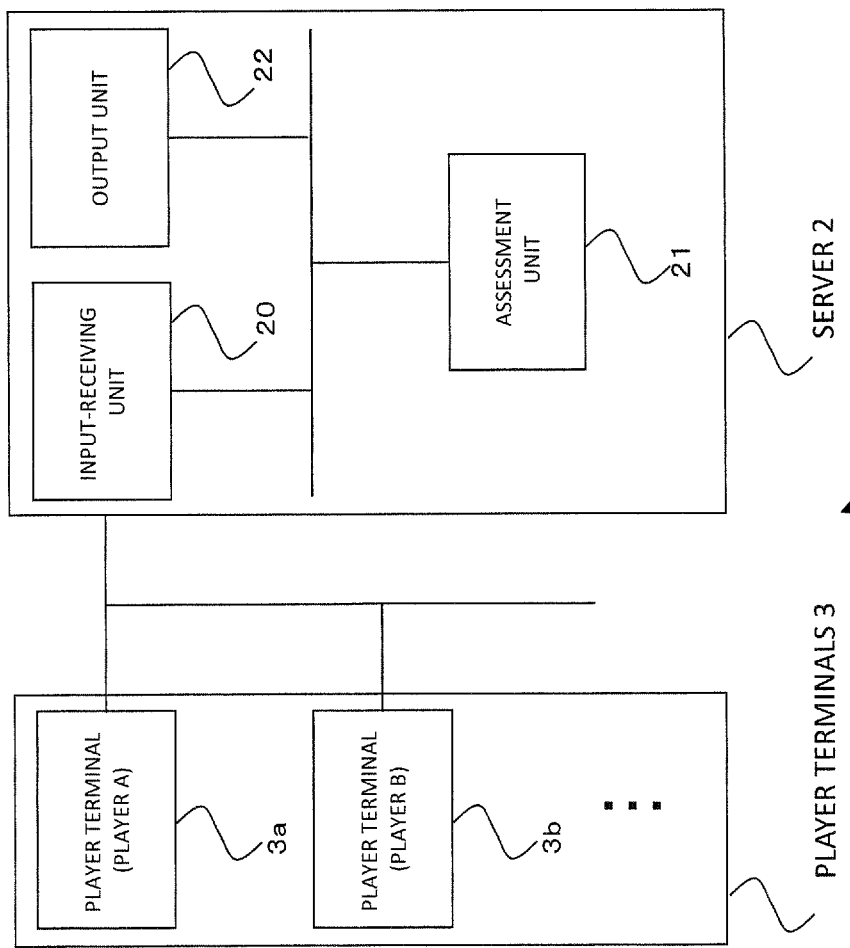
FIG. 2 schematically shows an example of the overall processing functions of the present invention.

A conceptual diagram of an example of the processing functions of the system 1 for assessing life and death in a game of Go of the present invention is schematically shown in FIG. 2. As described above, the present specification involves a case in which the Go-playing system is configured to run through a network. Therefore, the processing functions are provided to the servers 2, and information is transmitted and received through the network between the player terminals 3 used by the players, whereby the processes are implemented.

Figure 3:
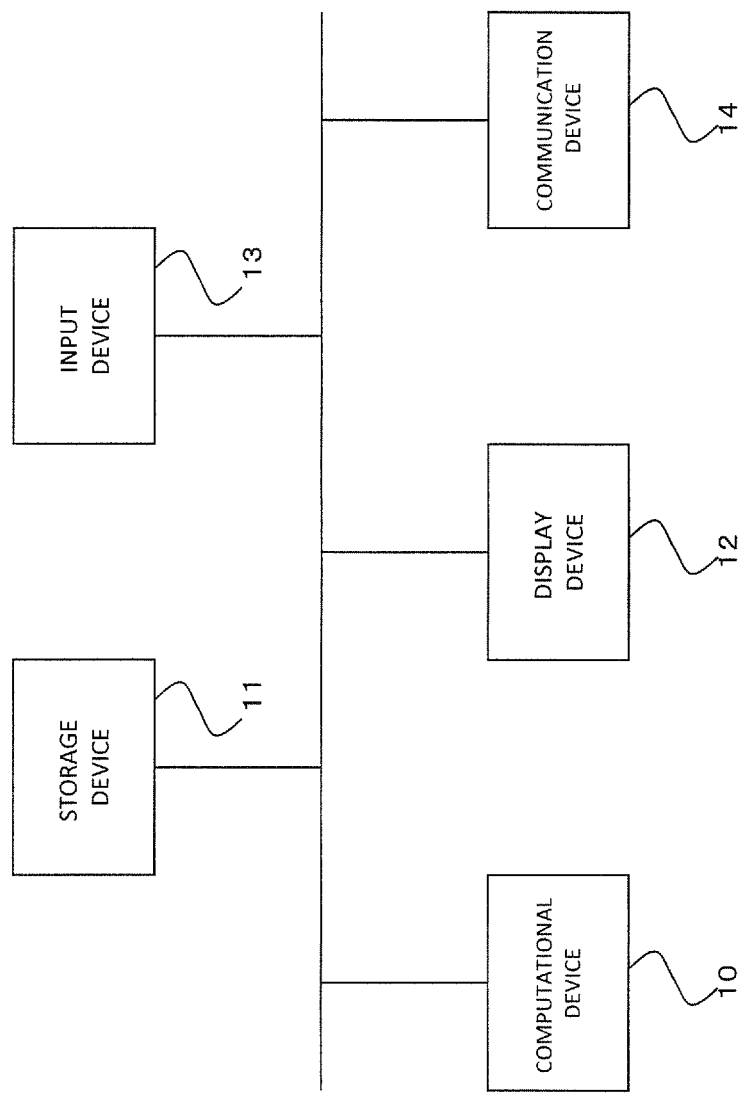
FIG. 3 schematically shows an example hardware configuration of a computer in which the present invention is employed.
Figure 5:
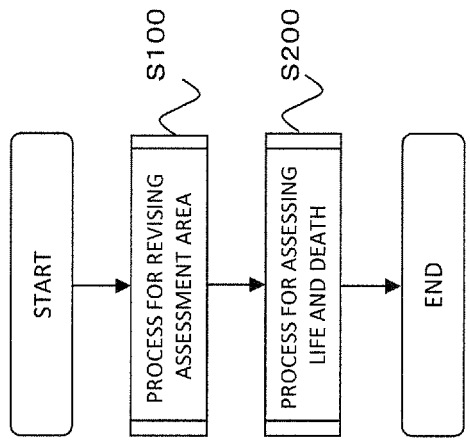
FIG. 5 schematically shows an example of the flow chart of the present invention.
Figure 4:
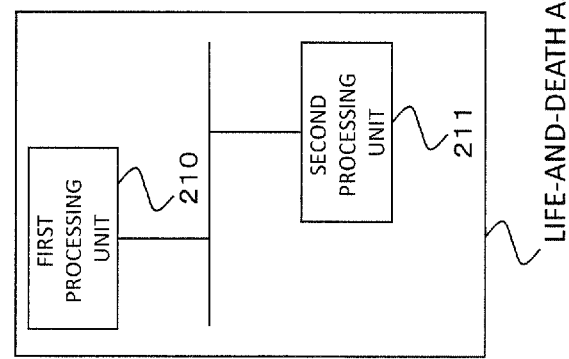
FIG. 4 schematically shows an example of the processing functions of the assessment unit.
Figure 6:
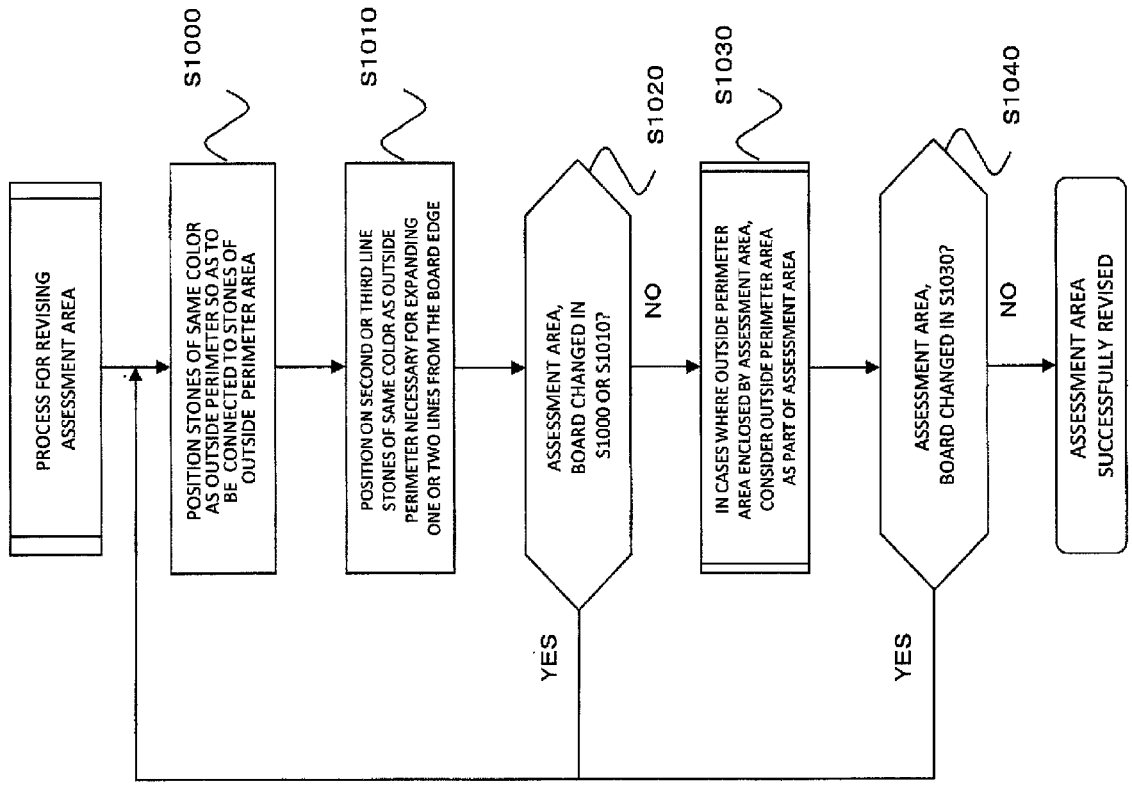
FIG. 6 schematically shows an example of a flow chart of the process for revising the assessment area.
Figure 8:
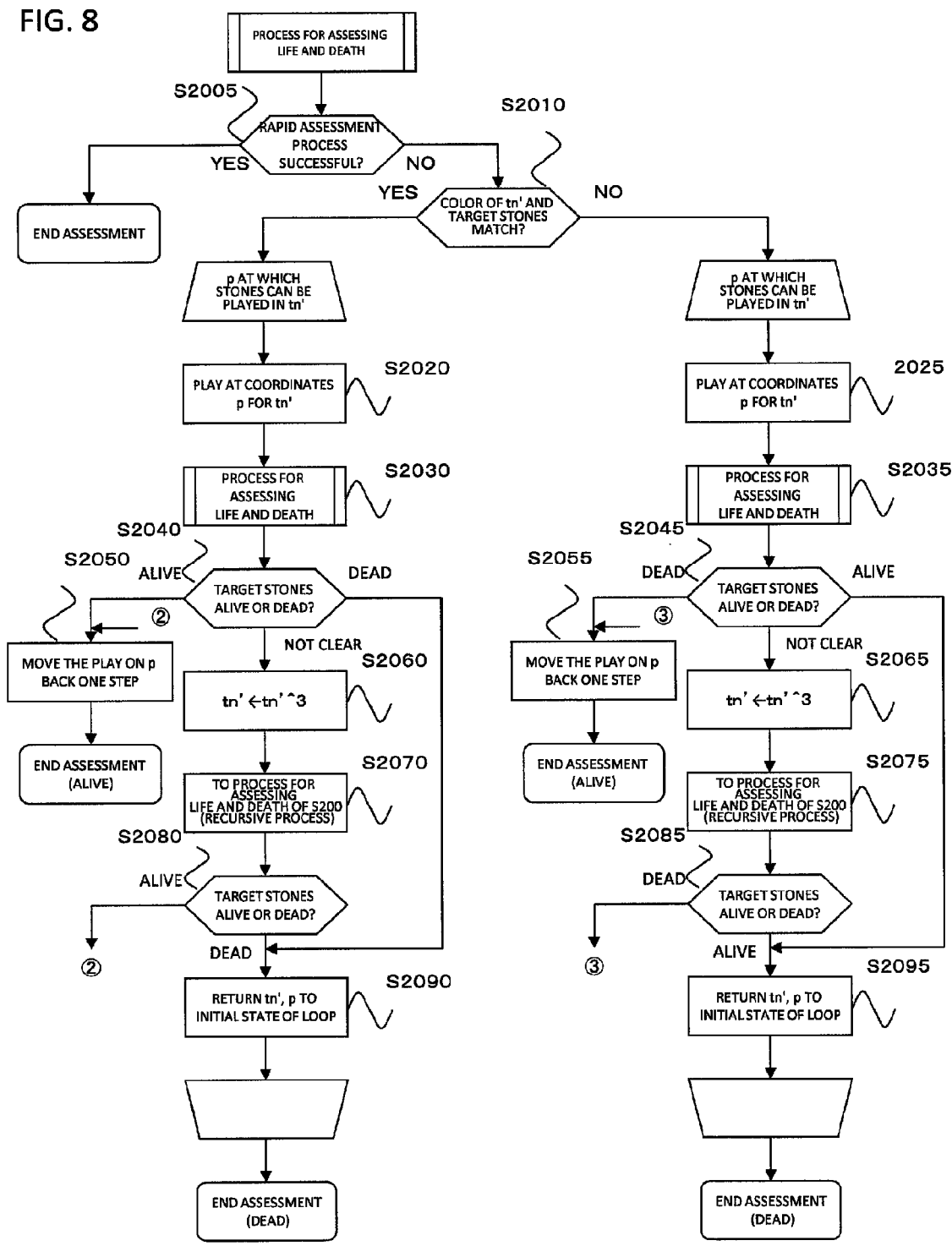
FIG. 8 schematically shows an example of a flow chart of the process for assessing life and death.
Figure 9:
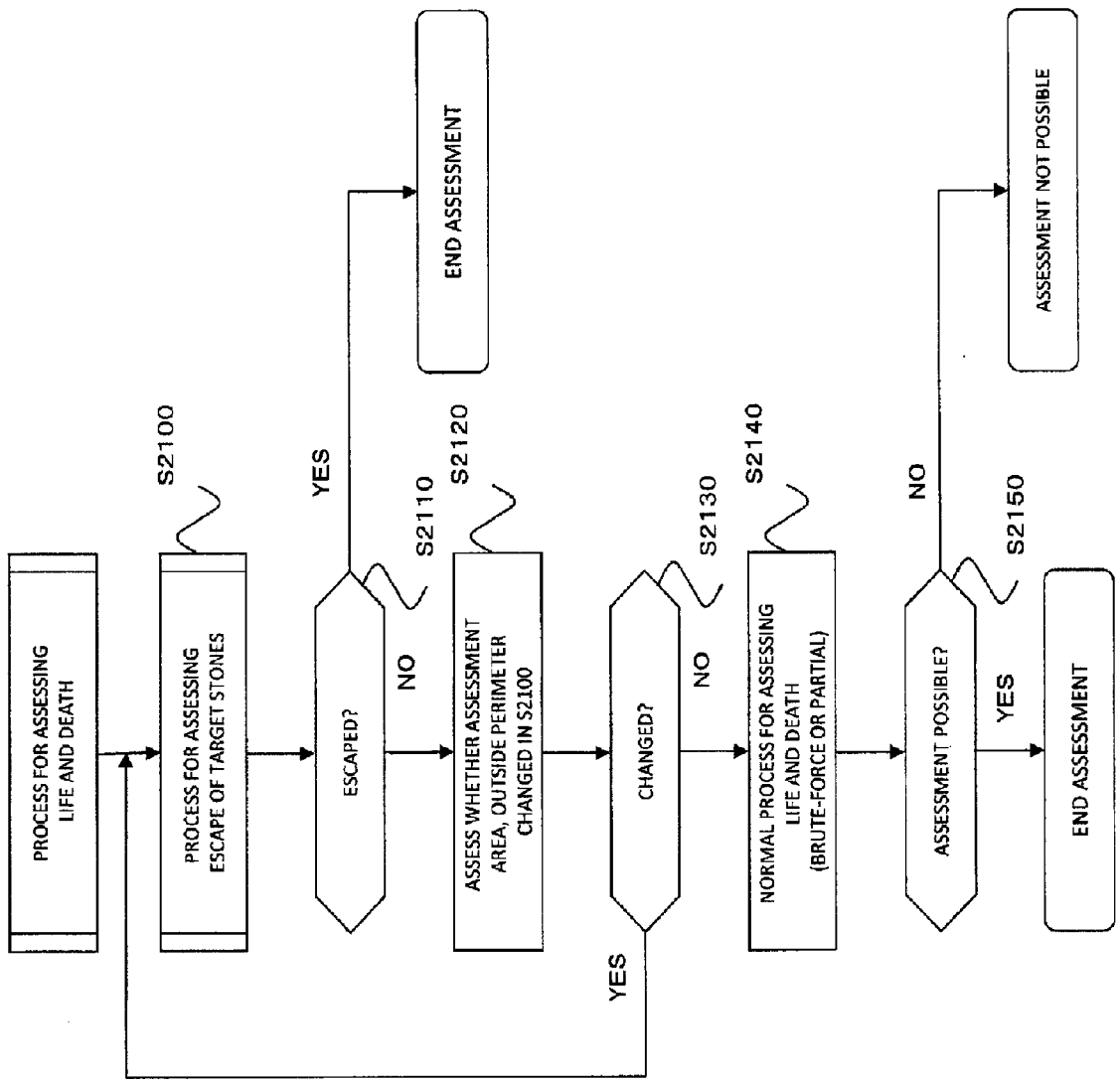
FIG. 9 schematically shows an example of a flow chart for life and death.
Figure 10:
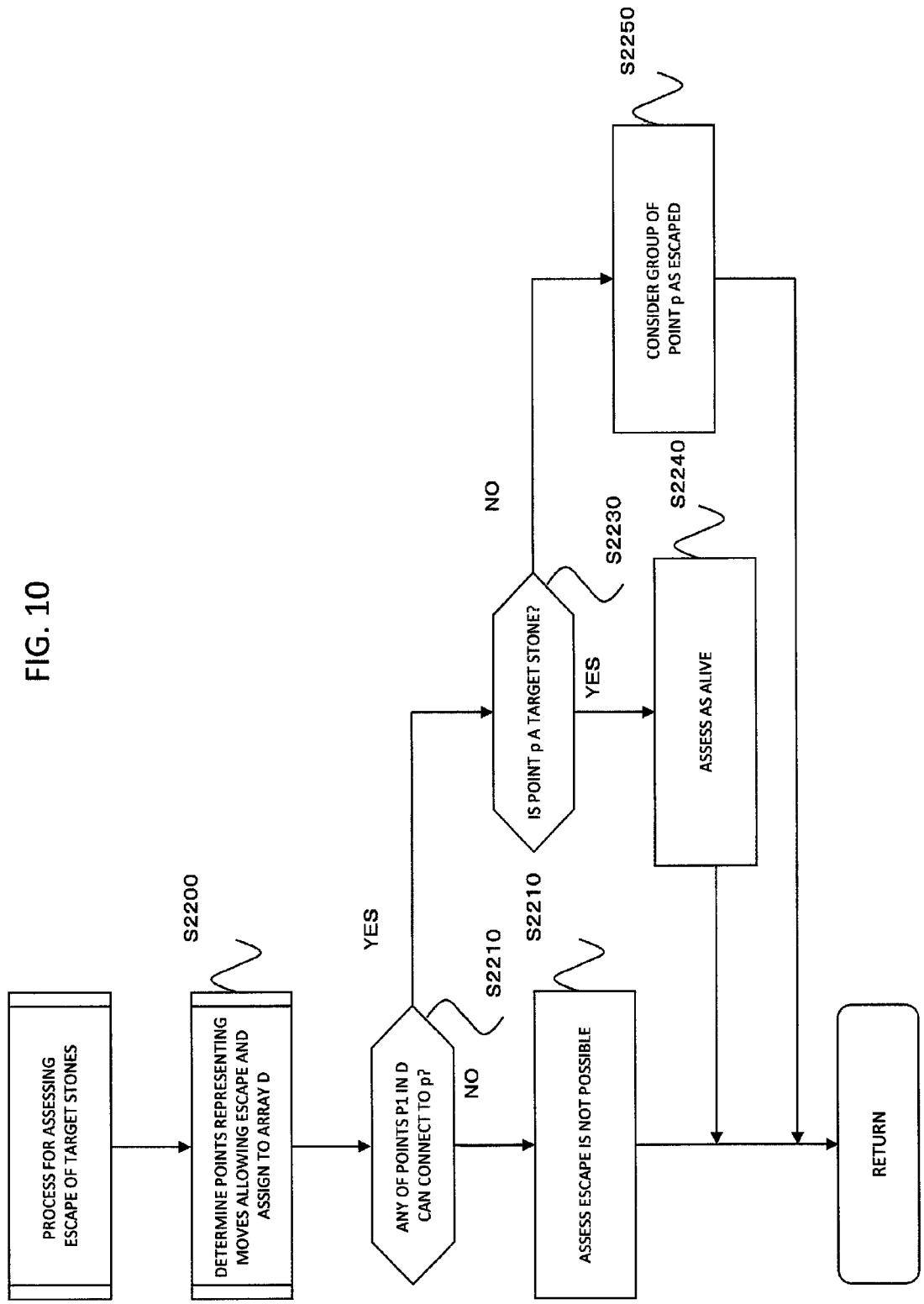
FIG. 10 schematically shows an example of a flow chart of the process for determining escape of the target stones.
Figure 11:
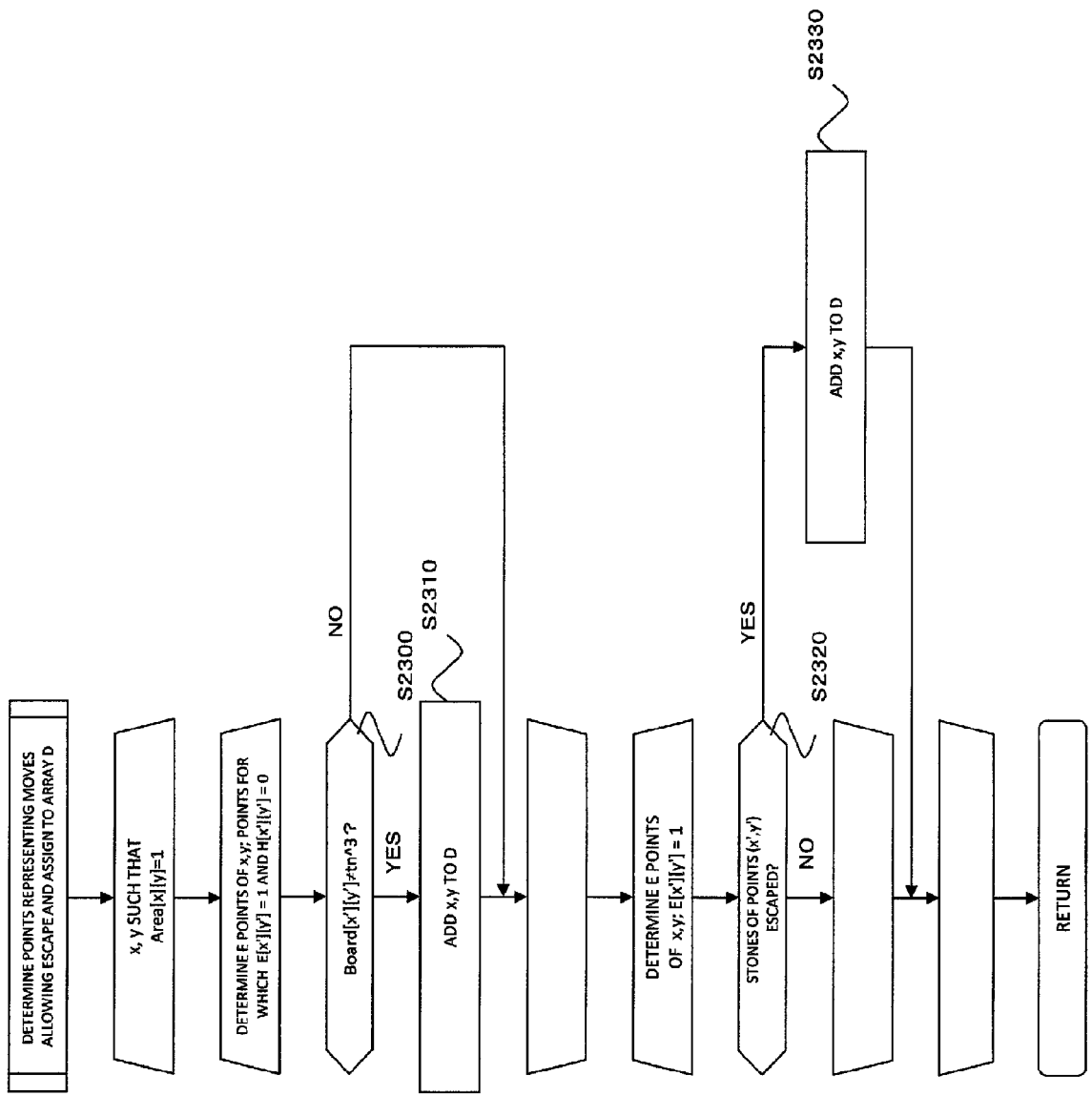
FIG. 11 schematically shows an example of a flow chart of process for determining moves that allow escape.

An example of the computer hardware configuration of the personal computer terminals and the like, which include the server 2 and the player terminals 3, is shown schematically in FIG. 3. The computers have a CPU or other computational device 10 for running the computational processes of the programs; a RAM, hard disk, or other storage device 11 for storing information; a display (screen) or other display device 12; a keyboard, pointing device (mouse, numeric key pad, or the like), or other input device 13; and a communication device 14 for transmitting and receiving through the Internet, a LAN, or other network the processing results of computational device 10 and the information stored in the storage device 11. Means for executing the processes thereof (programs, modules, and the like) are read by the computational device 10, whereby the processes of the functions (means) implemented in the computer are executed. In oases where the information stored in the storage device 11 is used for these processes, the functions read out the relevant information from the storage device 11, and the information read out is employed as appropriate for the processes in the computational device 10. The functions of the computer may also be dispersed among a plurality of computers.

The functions of the means of the present invention are only differentiated logically, and may constitute the same region physically or for practical purposes.

The server 2 has an input-receiving unit 20, an assessment unit 21, and an output unit 22. Although not shown in the present specification, identical or different servers 2 are provided, with the processing functions for implementing the Go-playing system, and the board information (i.e. the information required for using a computer to implement decisions concerning the placement of stones on intersections, player turns, and other aspects of a game of Go) is accordingly stored and managed. In cases where the life-and-death assessing system performs a process for assessing life and death, the board information and the like is acquired from the playing system and employed as appropriate in the process for assessing life and death.

The input-receiving unit 20 receives requests for assessing life and death, information concerning moves made, information concerning player turns, information concerning stones to be assessed, target stones, and the like, and other information necessary for assessing life and death from the player terminals 3. The output unit 22 sends the processing results of the assessment unit 21, the information to be displayed on the player terminals 3, and the like to the player terminals 3.

When the input-receiving unit 20 receives a request for assessing life and death from the player terminal 3, the assessment unit 21 acquires the board information from, the playing system and performs the process for assessing life and death on the basis of the information concerning the board or the board after editing by the player. At this time, information is received from the player terminal 3 concerning which region of the board is designated for assessing life and death, whereby information may be acquired and life-and-death assessments made for the board in that region rather than for the entire board. The input-receiving unit 20 additionally receives information concerning player turns, information concerning stones to be assessed, target stones, and other information necessary for assessing life and death from the player terminals 3, or automatically makes assessments, and employs this information to execute processes.

The process for assessing life and death basically involves using a brute-force approach in which stones are placed on points where stones have not been placed, and all of these patterns are successively assessed, as in the prior art, whereby the processing for assessing the life or death of the stones is performed. However, given the foregoing, the assessment cannot be performed if the outside perimeter (described hereinafter) is not a single color or does not constitute a single location. A first processing unit 210 and a second processing unit 211 are accordingly provided in the assessment unit 21 of the invention of the present application, and the processes thereof are executed, whereby processes for assessing life and death are executed that either could not be executed in the prior art or could not be executed in the prior art without first transforming the outer perimeter.

The assessment of life and death for the target stones (described hereinafter) is executed in the assessment unit 21, bat life-and-death-assessing programs similar to those in the prior art can be employed in such instances. The example described below gives a case in which the process for assessing life and death is performed using the brute-force approach, but methods making use of other conventional programs for assessing life and death can also be employed. A process for assessing life and death using a brute-force approach may involve using processes for assessing life and death used in conventional programs for assessing life and death, and does not necessarily involve using a brute-force approach for all empty points in the assessment area. For example, a method such as that in which processing is omitted for a portion of the empty points in the assessment area may be used. Methods for omitting processes include those in which the process is executed for only one move in cases where, e.g., a plurality of moves having the exact same value exists. In other words, the process for assessing life and death may be performed using any arbitrary method as long as the method can execute a process for assessing the life and death of the target stones in the assessment area. Cases of assessment processes using a brute-force approach (or brute-force employing efficient processes in which processing is not performed for a portion of the empty points) are given as the process for assessing life and death in the present specification, but as long as the method can assess life and death, any method can be used, even if the method does not involve a process for assessing life and death using a brute-force approach.

Computer programs such as those described in the aforedescribed Non-Patent Documents are examples of conventional programs for assessing life and death. The programs can be employed as appropriate but are not given by way of limitation.

In addition to the aforedescribed processes, the processes described, in Japanese Patent No. 4607230, Japanese Patent No. 4607236, Japanese Patent Application No. 2010-50406, Japanese Patent Application No. 2010-50407, Japanese Patent Application No. 2010-50408, and other processes for assessing life and death can also be used.

The terms employed in describing the examples given hereinafter are described below. Stones to be assessed are stones for which a conclusion should be reached concerning whether the stones are alive or dead. All of these stones are of one color within the assessment area. In cases where at least one stone is alive, the result of the life-and-death assessment is "alive," and in cases where all of the stones can be captured, the result of the life-and-death assessment is "dead." The target stones are all or a portion of the stones to be assessed and are the stones for which a conclusion should be reached concerning life and death. However, in cases where the target stones have been designated, the result of the life-and-death assessment is "alive" in cases where all of the target stones are alive, and the result of the life-and-death assessment is "dead" in cases where at least one of the target stones can be captured. The target stones may be designated by a player but need not be.

An assessment area, which includes a collection of points, is the area in which positioning of stones is possible during an assessment. A group is a collection of stones of the same color that adjoin (stones positioned horizontally or vertically) and are connected. An outside perimeter area includes a collection of points which are in all, or a portion of, the area outside the assessment area. The outside perimeter includes a collection of points which are in the outside perimeter area, and which have-associated E points and O points in the assessment area.

The assessment unit 21 has the first processing unit 210 and the second processing unit 211.

In a conventional process for assessing life and death, the stones that form the outside perimeter are a single group (one color and one location), and therefore points at which escape is possible are at maximum, two in number. However, [these assumptions] lead to the limitations described above. However, when the stones that form, the outside perimeter constitute a plurality of locations, the method for setting the assessment area must be changed so that points that allow escape number three or more during the assessment. This process is accordingly executed by the first processing unit 210.

Specifically, the first processing unit 210 first determines preferably all of the points that are within two lines (though the number "two" is not given by way of limitation and may be one, three, or another number within a predetermined range) of the outside perimeter and the board edge. The assessment area is expanded in the direction of the outside perimeter area according to the distance of the separation. In cases where the expanded, points are already included in the assessment area, the entire area of the outside perimeter (outside perimeter area) thereby enclosed within the assessment area is set as [part of] the assessment area.

The second processing unit 211 executes the processes in which the second processing unit 211 executes the processes for executing the assessment of life and death on the assessment area revised by the first processing unit 210. In other words, when stones in the assessment area set by the first processing unit 210 have escaped, the second processing unit assesses that the stones are alive in cases where no target stones have been designated or where the escaped stones are target stones, and in other cases continues the assessment process while considering the escaped stones as stones that cannot be captured. At this time, the assessment process is continued under the added condition that the target stones that are connected to these stones (the stones that cannot foe captured) are alive.

The process for assessing life and death of the target stones can employ programs for assessing life and death in the manner of the prior art. In the examples below, cases are given in which the process for assessing life and death of the target stones uses a brute-force approach, but methods using other conventional programs for assessing life and death can also be employed. A process for assessing life and death using a brute-force approach may be a process for assessing life and death employed in a conventional program for assessing life and need not necessarily involve a brute-force process performed on all of the empty points within the assessment area. For example, the method may omit processing for a portion of the empty points among the empty points within the assessment area. For example, methods and the like for omitting processing exist in which processing is only executed for one move in cases where a plurality of moves of exactly equivalent value exist.

The second processing unit 211 can employ various processes for accelerating the process for assessing life and death of the target stones (rapid assessment processes), e.g., the processes in Japanese Patent No. 4607230, Japanese Patent No. 4607236, Japanese Patent Application No. 2010-50406, Japanese Patent Application No. 2010-50407, and Japanese Patent Application No. 2010-50408, and other processes for assessing life and death.

For example, methods for executing brute-force (or partial) processes for assessing life and death exist in which a move priority is given to each of the points, and the brute-force (or partial) process for assessing life and death is performed according to the priority of each point, where the processing priority of each of the moves is modified so that the brute-force approach proceeds in order of priority from the highest chances of giving a result for the life-and-death assessment.

Methods for executing brute-force processes for assessing rife and death also exist in which the points to be processed in the brute-force (or partial) process for assessing life and death are reduced. Processes for reducing the points to be processed involve, e.g., extracting a closed area (an area in which the opponent's stones are ignored and that is closed off only toy the stones of the player in question or by stones of the player in question and the board edge) that includes the target stones from among the original or revised assessment area, positioning stones of a color different from the target stones on points that are outside the closed area and that fulfill predetermined conditions (e.g., at least one point on the points that adjoin the outside perimeter), and considering the newly positioned stones as the outside perimeter, whereby the points to be processed are reduced. Alternatively, the empty E points of the outside perimeter in the assessment area are extracted, stones of a color different from the target stones are positioned on at least one point from among the extracted empty E points (e.g., points including at least two or more stones on the outside perimeter included in the E points among the empty E points on the outside perimeter extracted from the assessment area, but not including a single target stone), and the newly placed stones are considered as the outside perimeter, whereby the points to be processed are reduced. The brute-force or partial process for assessing life and death is thus executed after reducing the points to be processed.

When performing a brute-force (or partial) process for assessing life and death, the process for assessing life and death is executed after partitioning the board within the assessment area using a predetermined method and transforming the respective areas into eye shapes. In other words, the board within the assessment area is partitioned using a predetermined method, and one of the areas among the partitioned areas is transformed so as to have the most disadvantageous eye shape, after which a brute-force or partial process for assessing life and death is executed on the entirety of the assessment area.

Additionally, the brute-force (or partial) process for assessing life and death is executed so that, when, performing the brute-force or partial process for assessing life and death, moves are limited, and in addition to the normal, conditions for life, an assessment of "alive" is made if the number of open points adjoining the target, stones is large, whereby an assessment of whether or not the stones are dead is readily made.

Executing the rapid assessment processes as above allows the assessment of life and death to be performed more quickly than in simple brute-force processes.

Example 1

The data format and terminology employed in describing the example will first be described below.

The board data is represented as "Board [x] [y]" (where 1≤x≤19 and 1≤y≤19). The points on the board are assigned "0" if empty, "1" if black, and "2" if white.

The player turn is given by "tn." At "tn^3" the color is that of the opponent, with representing a bit operation.

A stone to be assessed is represented as "H [x] [y]." Stones to be assessed are assigned "1," and stones that are also target stones are assigned "2."

The assessment area is represented as "Area [x] [y]" (where 1≤x≤19 and 1≤y≤19). Points in the assessment area are assigned "1," and points outside the assessment area are assigned "0".

"Grouping" is a process for assigning a collection of points horizontally or vertically adjoining a point of the same color into an array.

"E points" are collections of points that adjoin a given stone on vertical or horizontal lines (separated by a distance of only one line). As shown in FIG. 13, the points at which "E" is written are the E points for the single black stone, E points of a group of a plurality of stones are the total collection of E points of all the stones that constitute the stone group, minus the points occupied by the stone group. An example of this case is given in FIG. 14.

"O points" are the collection of points adjoining a stone diagonally (separated by a distanced of only one line). As shown in FIG. 15, the points at which "O" is written are the O points for the single black stone. O points of a group of a plurality of stones are the total collection of O points of all the stones that constitute the stone group, minus the points occupied by the stone group and the E points of the stone group. An example of this case is given in FIG. 16.

Figure 17:
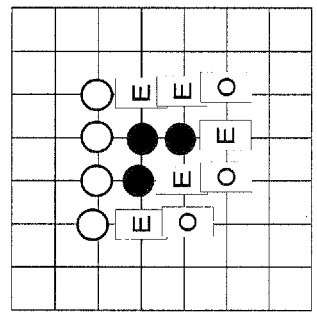
FIG. 17 shows an example of the E empty points and the O empty points.

Empty E points are the collection E points of the stone group at which no stones are placed. Empty O points are the collection of O points of the stone group at which no stones are placed. An example of this case is given in FIG. 17.

In cases where a group of points (a collection of points of the same color linked horizontally or vertically) have been acquired, the results thereof are assigned to an array. For example, in cases where the group of a point (x1, y1) has been assigned to an array G, for G [x] [y], "1" is assigned if the point is in the group, and "0" is assigned if the point is not in the group.

In cases where a closed area of a specific color containing a given point has been acquired, the results thereof are assigned to an array. For example, in cases where a closed area for [turn] in including a point (x1, y1) has been assigned to an array C, for C [x] [y], "1" is assigned for a stone constituting [part of] the closed area, "2" is assigned for a point constituting [part of] the interior of the closed area, and "0" is assigned for other points.

An example of the processes in the system for assessing life and death of the present example will foe described next using FIGS. 5 through 12.

The game of Go is carried out through a network using the player terminals 3 used by the players. The processes for the game of Go are performed in the server 2 for implementing the playing system. Paring or after the game, either player depresses a predetermined button or the like on a screen on which the game is displayed, whereby a request for performing a process for assessing life and death is transmitted from the player terminal 3 to the server 2 that performs the process for assessing life and death. An example of the game screen is shown in FIG. 18.

Figure 18:
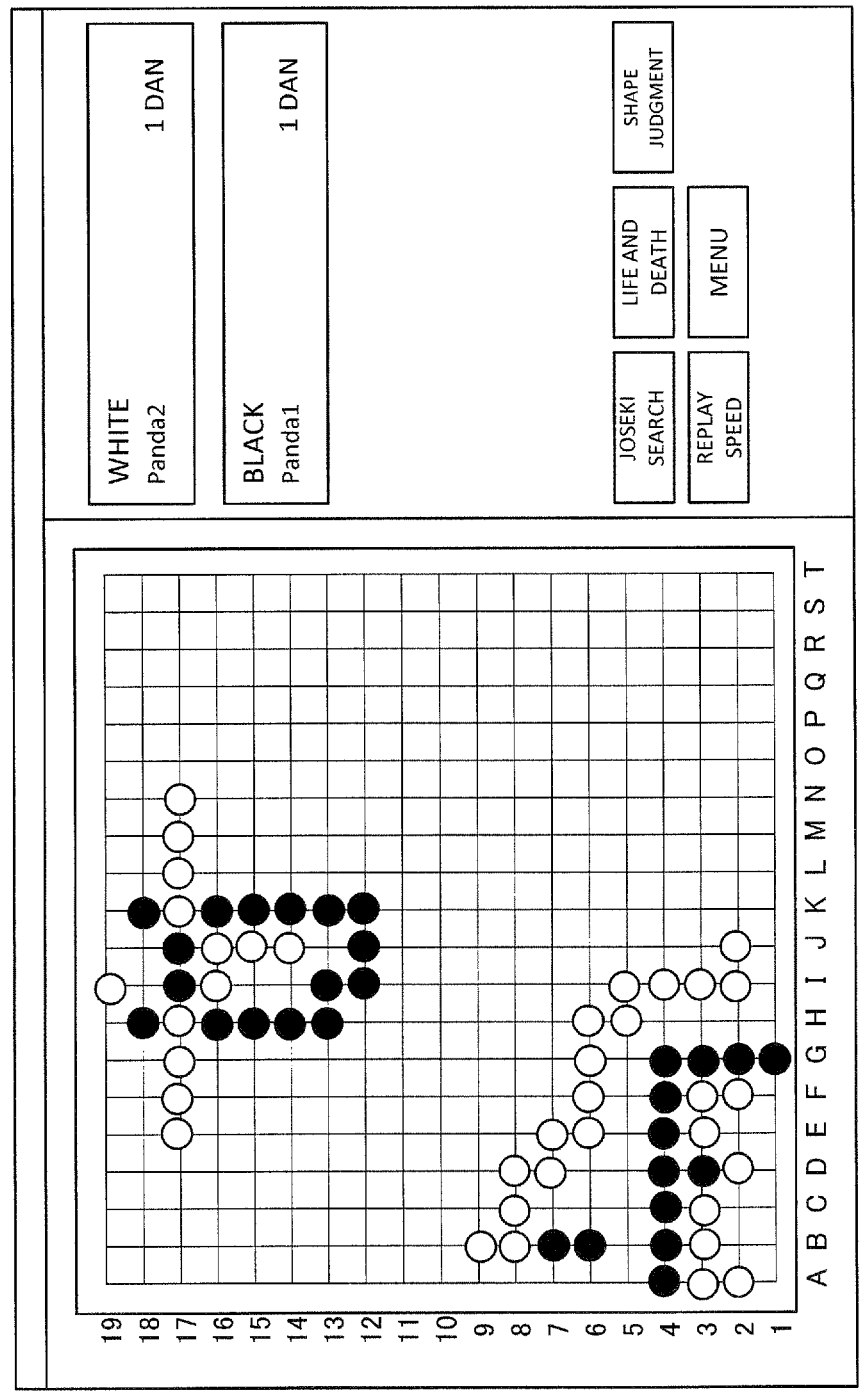

In the case of the game screen of FIG. 18, depressing "life and death" or another button on the screen for requesting a process for assessing life and death to be performed causes a request for performing a process for assessing life and death to toe transmitted from the player terminal 3 to the server 2.

When the request is received by the input-receiving unit 20 of the server 2, the assessment unit 21 acquires information concerning the board (e.g., game-record information) from the storage device 11 of the playing system. The output unit 22 transmits a screen for the process for assessing life and death to the player terminal 3, where the board information is included in this screen. An example of the screen at this time is given in FIG. 19. Besides information about the board where play is actually taking place, information concerning the game record, which has already been played and is stored in the predetermined storage device 11, or information concerning the game records of spectator games are acquired from the storage device 11 of the playing system by the assessment unit 21, and the information concerning these game records may also be included in the screen of FIG. 19 and transmitted to the player terminal 3.

Figure 19:
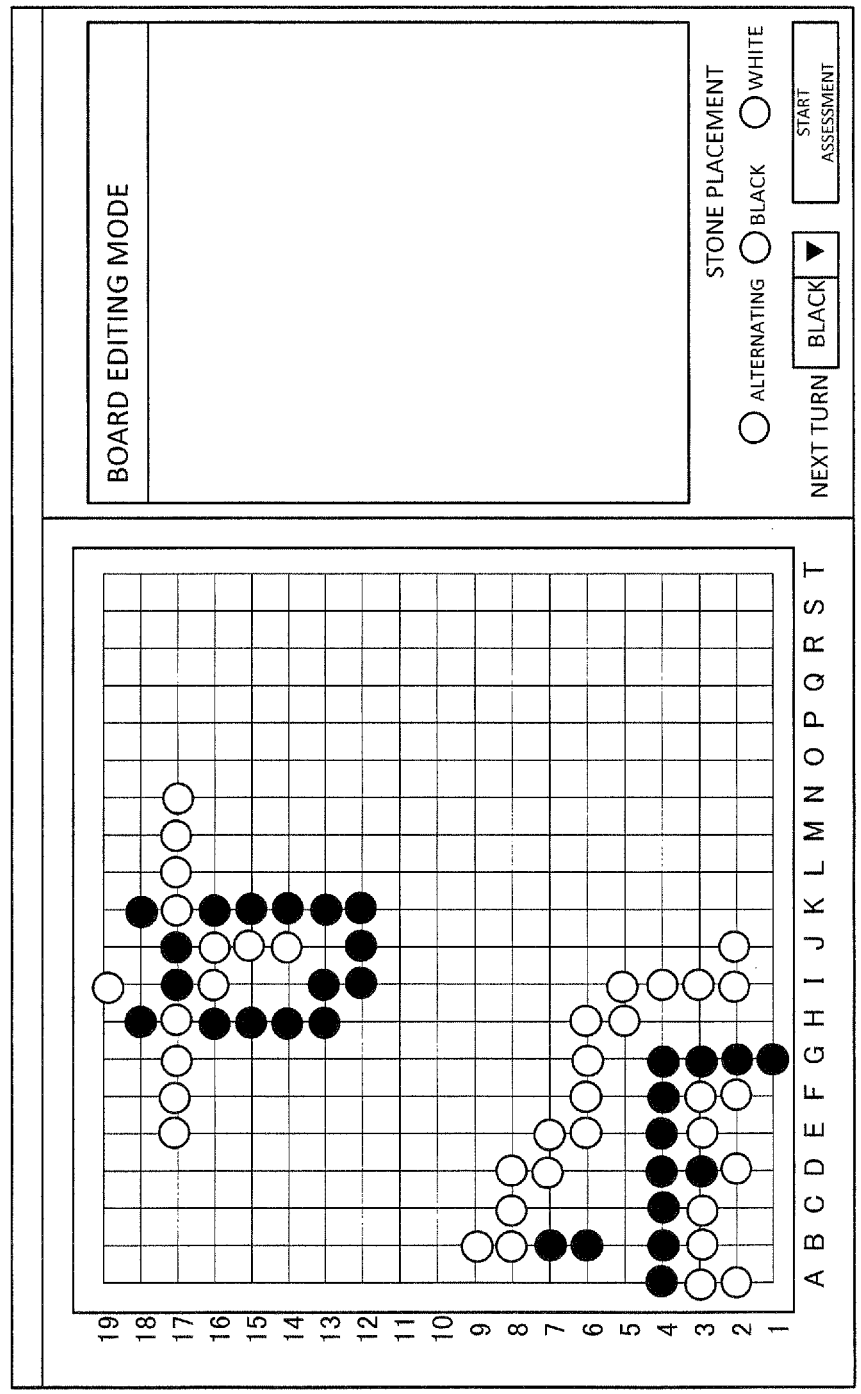
FIG. 19 shows an example of an editing screen.

The player performing the life-and-death assessment edits the board from the screen for performing the process for assessing life and death shown in FIG. 19, The player, e.g., designates the stones displayed, whereby stones are removed or placed. The assessment area is designated by, e.g., clicking and dragging a mouse or other implementation of the input device 13. The player desiring a process for assessing life and death thus edits the board information as appropriate. Information concerning the stones edited at this time, information concerning player turn, and other information is sent from the player terminal 3 to the server 2 as appropriate. The assessment area may also be set automatically on the basis of the board information.

The player designates the assessment area as described above, whereby the stones in the assessment area for which a conclusion should be reached are set as the stones to be assessed. The player sets specified stones (the target stones) from among the stones to be assessed as the stones for which a conclusion should be reached. All or part of the stones to be assessed may be set as the target stones.

Figure 20:
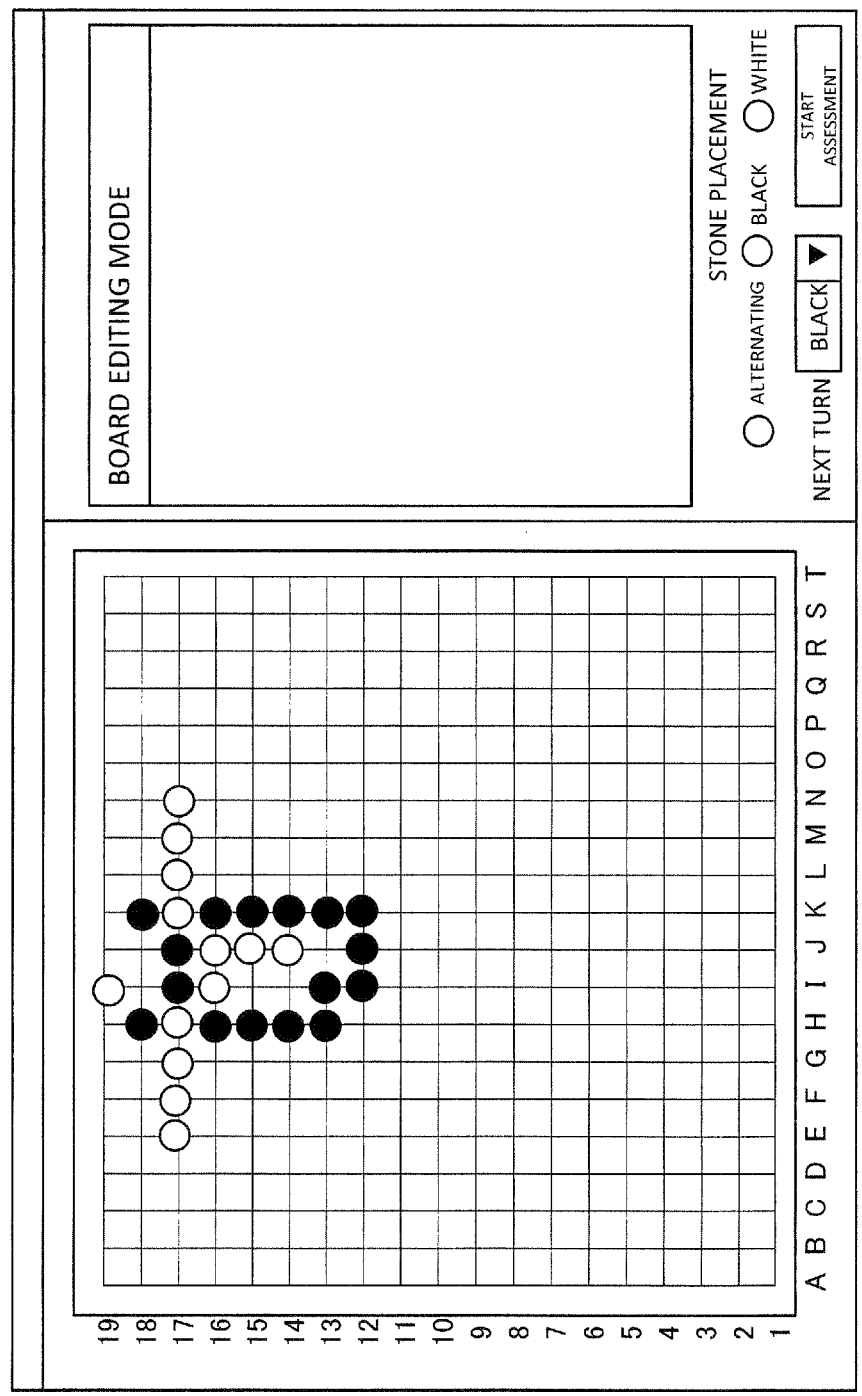
FIG. 20 shows an example of an editing screen.
Figure 21:
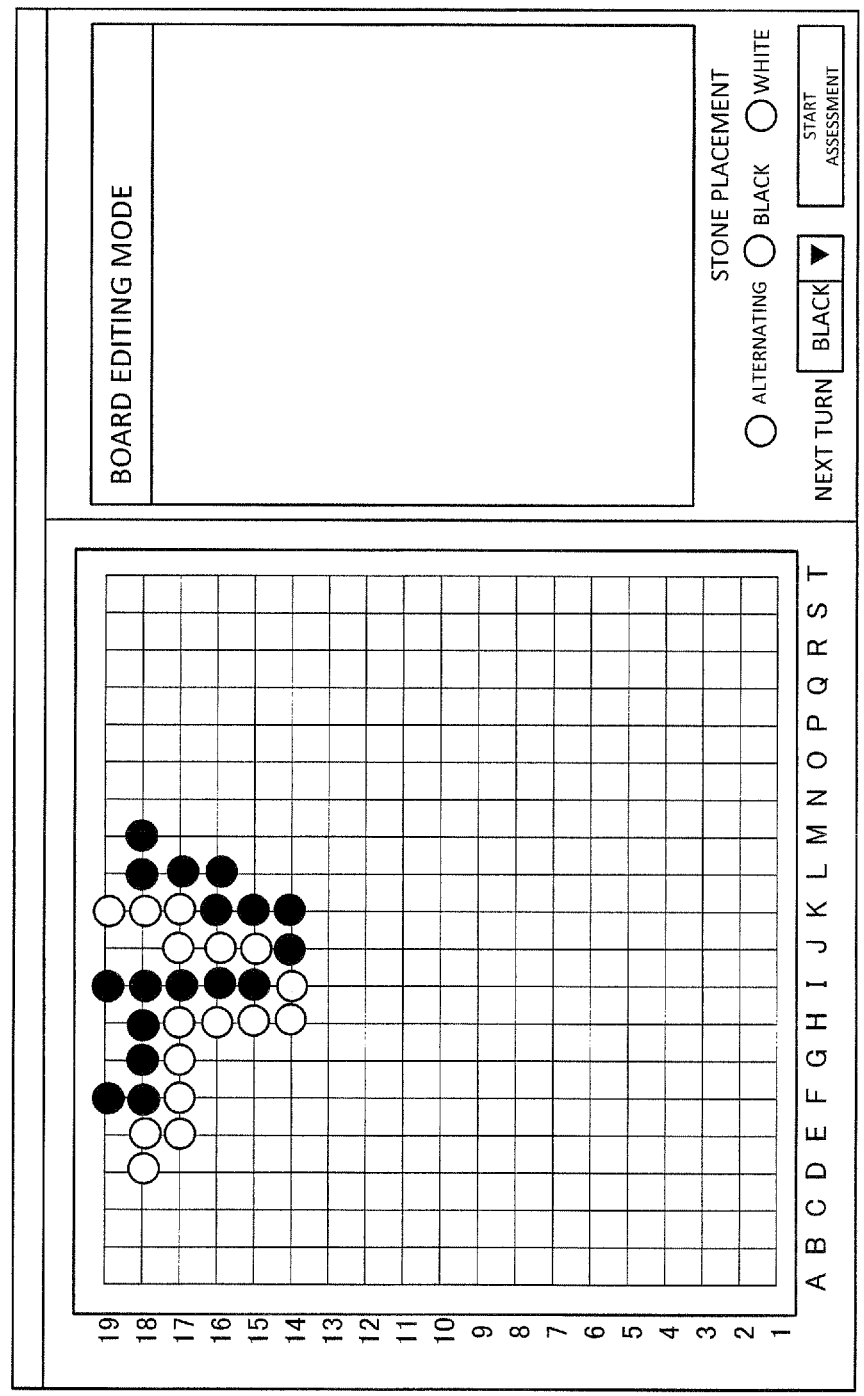
FIG. 21 shows an example of a board in which the prior art would not be able to assess life and death.
Figure 22:
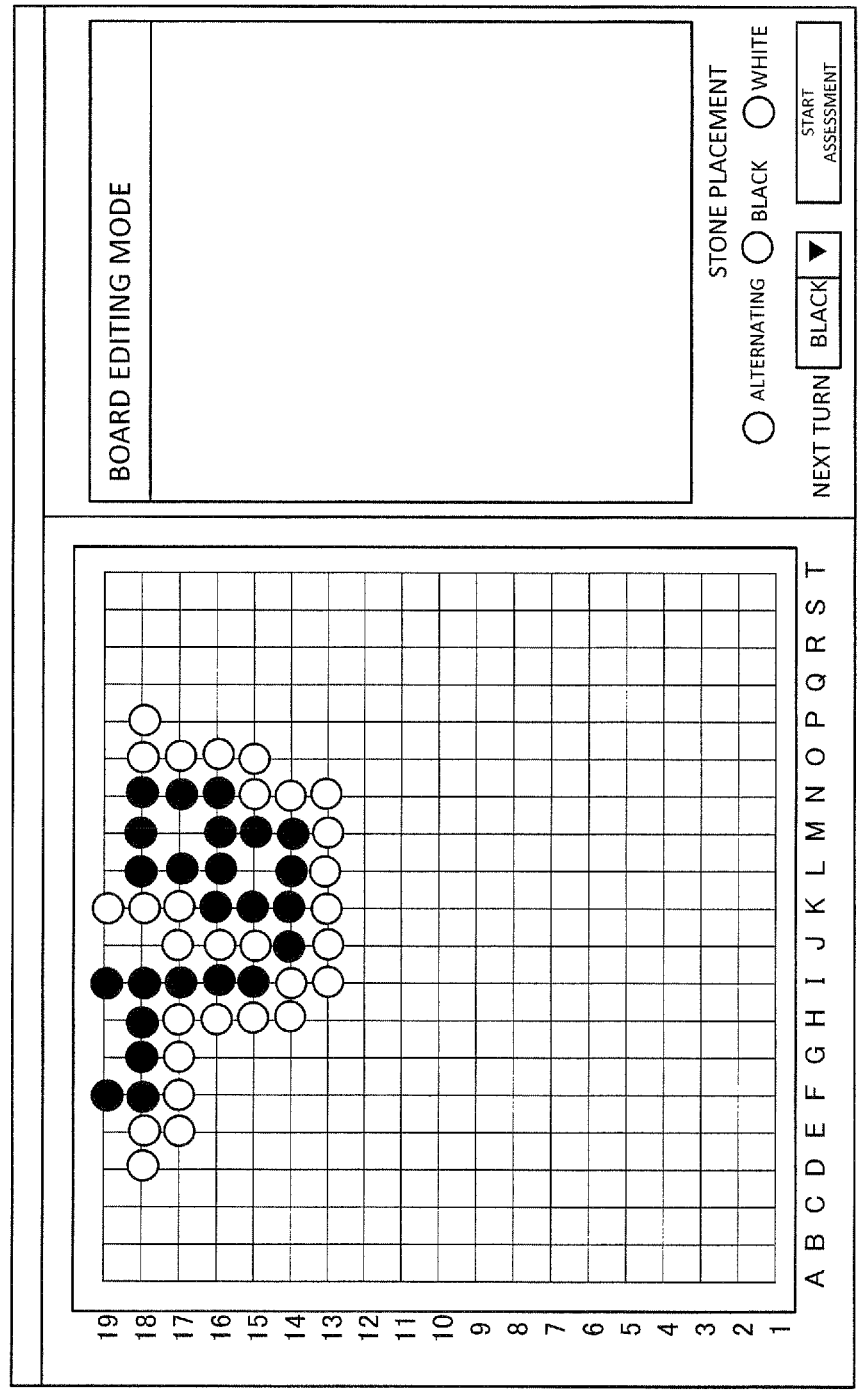
FIG. 22 shows an example of a board resulting from transforming the board of FIG. 21 according to the prior art.
Figure 23:
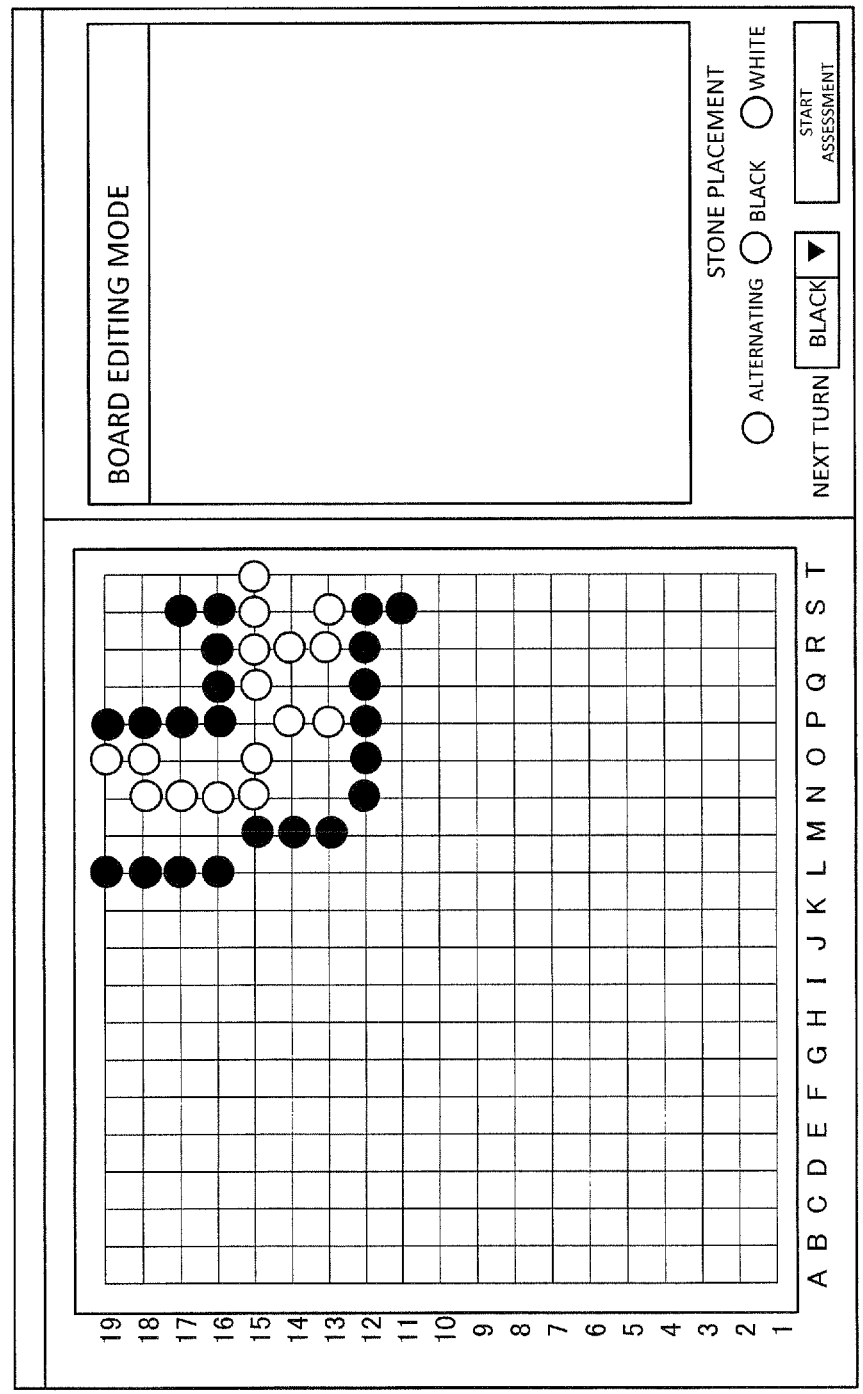
FIG. 23 shows an example of a board in which the prior art would not be able to assess life and death.
Figure 24:
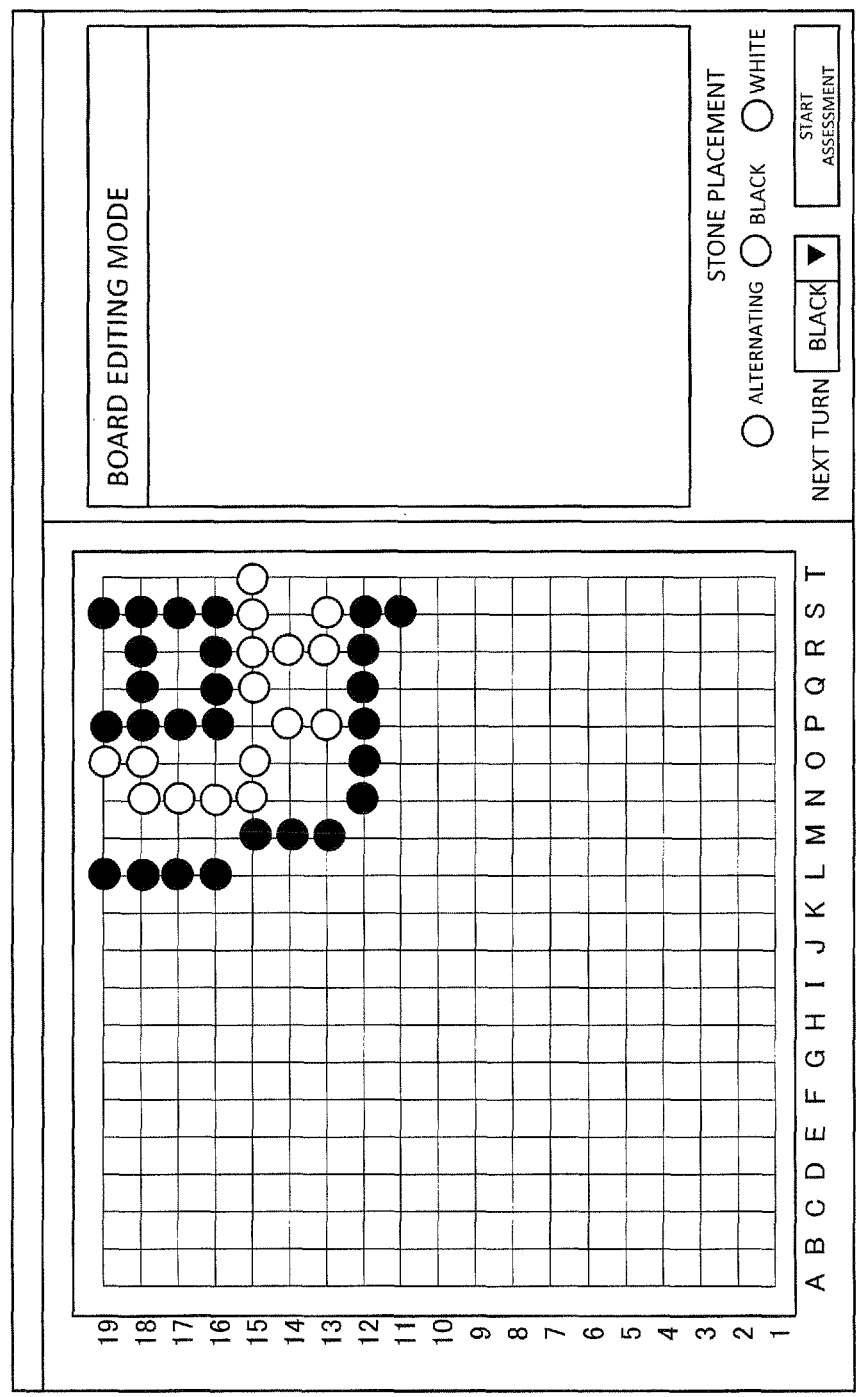
FIG. 24 shows an example of a board resulting from transforming the board of FIG. 23 according to the prior art.

An example of an edited screen for performing the process for assessing life and death is shown in FIG. 20. In FIG. 20, the target stones are the 16 black stones, and it is White's turn. Other than indicating the color of the next stone to be played, "turn" in Go refers to an assessment of winning or losing (life or death) from the perspective of whichever player's turn it is. In this case, therefore, the next stone played will be white, which means that the life-and-death assessment for the 16 black stones will be performed from the perspective of the white stones.

For example, depressing "Start assessment" in the screen of FIG. 20 causes the edited board information (information concerning the game record, information concerning the target stones, and the like), the information concerning player turn, and the request for starting the process for assessing life and death to be transmitted from the player terminal 3 to the server 2. When the edited board information, the information concerning player turn, and the request for starting the process for assessing life and death are received by the input-receiving unit 20 of the server 2, the assessment unit 21 starts the process for assessing life and death on the basis of the edited board information received as input.

The assessment unit 21 first executes a process for revising the assessment area in the first processing unit 210 (S100).

Specifically, the first processing unit 210 first positions in an adjoining fashion stones of the same color as the outside perimeter so as to be connected to the stones of the outside perimeter (S1000). Thereafter, the first processing unit 210 positions on the second or third line from the board edge stones of the same color as the outside perimeter, where these stones are necessary to expand an area on the first or second line (S1010).

In cases where the assessment area and the board were changed in S1000 or S1010, the process repeats from S1000 (S1020).

Meanwhile, in cases where the assessment area and the board were not changed in S1000 or S1010, the first processing unit 210 executes the process of S1030 (S1020). In other words, in cases where the outside perimeter area is enclosed by the assessment area, the first processing unit 210 executes a process for defining the outside perimeter area as [part of] of the assessment area (S1030).

Specifically, assignments are first made for all of the points (x, y) such that array B [x] [y]=H [x] [y] (S1100).

For all of the points (x, y) for which B [x] [y]=0, the points (x, y) are first made into a group. In other words, array G [x'] [y'] is made to equal 1 (S1110).

For all of the points (x', y') for which G [x'] [y']=1, B [x'] [y'] is assigned to equal 1 (S1120).

When the process of S1120 is executed for all of the points (x', y'), for all of the points (x', y') for which G [x'] [y']=1, the points (x', y') are assessed as to whether these points have coordinates on the board edge (S1130). In cases where the coordinates are on the board edge, the aforementioned repeating process is interrupted, and the flow moves to the process for the next points (x, y) for which B [x] [y]=0. Meanwhile, in cases where the coordinates are not on the board edge, the process of S1130 is executed for the next points (x', y').

In the process of S1130, if not all of the points (x', y') have coordinates on the board edge, H [x'] [y'] is next assigned to equal 1 for all of the points (x' y') for which G [x'] [y']=1 (S1140).

When the process of S1140 is executed on all of the points (x', y') for which G [x'] [y']=1, the flow moves to processing of the next points (x, y) for which B [x] [y]=0.

Executing the aforementioned processes on all of the points (x, y) for which B [x] [y]=0 allows the first processing unit 210 execute a process for defining the outside perimeter area as [part of] the assessment area in cases where the outside perimeter area is enclosed by the assessment area.

After executing the process of S1030 as above, the first processing unit 210 assess whether the assessment area and board changed in S1030 (S1040). The aforedescribed processes are executed once again from S1000 in cases where the assessment area and the board have changed. Meanwhile, the first processing unit 210 ends the process for revising the assessment area in cases where the assessment area and the board have not changed.

The assessment unit 21 then ends the processes in the first processing unit 210 and thereafter executes the processes in the second processing unit 211 (S200).

The second processing unit 211 first executes a process for rapid assessment of the life and death of the target stones in the assessment area revised by the first processing unit 210, and assesses whether or not these processes were successful. For example, the processes of Japanese Patent No. 4607230, Japanese Patent No. 4607230, Japanese Patent Application No. 2010-50406, Japanese Patent Application No. 2010-50407, Japanese Patent Application Mo. 2010-50408, or other rapid processes for assessing life and death are executed on the basis of the assessment area revised in S100, and an assessment is made as to whether a conclusion was thereby reached concerning the life and death of the target stones (S2005). In cases where a conclusion was reached, the assessment results are outputted by the output unit 22. In other words, the output unit 22 transmits the processing results for the results of the life-and-death assessment to the player terminal 3. The player sees [these results] on the screen and thereby learns the results of life-and-death assessment.

For example, a brute-force for partial) process for assessing life and death exist is executed in which the brute-force (or partial) process for assessing life and death is performed according to the priority of each point, where the processing priority of each of the moves is modified so that the brute-force approach proceeds in order of priority from the highest chances of giving a result for the life-and-death assessment.

Brute-force (or partial) processes for assessing life and death are executed so that the points to be processed in the brute-force (or partial) process for assessing life and death are reduced.

Brute-force (or partial) processes for assessing life and death are further executed such that the process for assessing life and death is executed after partitioning the board within the assessment area using a predetermined method and transforming the respective areas into eye shapes. In other words, the board within the assessment area is partitioned using a predetermined method, and one of the areas among the partitioned areas is transformed so as to have the most disadvantageous eye shape, after which the process for assessing life and death is executed on the entirety of the assessment area.

Additionally, the process for assessing life and death is executed so that, when performing the brute-force (or partial) process for assessing life and death, moves are limited, and in addition to the normal conditions for life, an assessment of "alive" is made if the number of open points adjoining the target stones is large, whereby an assessment of whether or not the stones are dead is readily made.

As described above, the second processing unit 211 executes the rapid assessment process on the assessment area revised in S100, and, in cases where the results of the execution are obtained, outputs the results thereof for life and death. Meanwhile, in cases where the results for life and death were not obtained by the rapid assessment process, the processes of S2020 and beyond are executed.

Executing the rapid assessment process is optional and need not be done. In such cases the process of S2010 is executed, immediately. In other words, an assessment is made as to whether the color of the player of the current turn and the color of the target stones match (S2010). In other words, when the color of the target stones is black, an assessment of matching is made in cases where the color of the player of the current turn is black, and an assessment of not matching is made in cases where the color of the player of the current turn is white.

In cases where the colors of the player of the current turn and of the target stones match, S2020, S2030, S2040, S2050, S2060, S2070, S2080, and S2090 are executed on points p that could be played on during the given turn (the assessed points optionally include all of the points p). Meanwhile, in cases where the colors of the player of the current turn and of the target stones do not match, S2025, S2035, S2045, S2055, S2065, S2075, S2085, and S2095 are executed on the points p that could be played on during the given turn (the assessed points assessed optionally include all of the points p).

In cases where the colors of the player of the current turn and of the target stones match, moves are played for turn tn' for the points p at which a stone could be played during tn' (S2020). The process for assessing life and death (assessment process for life and death) is executed on the basis of those moves (S2030).

The second processing unit 211 first executes a process for assessing escape of the target stones in states in which the moves in S2020 have been made (S2100).

In the process for assessing escape of the target stones, the points representing moves that allow escape are first determined and assigned to an array D (S2200). In order to determine when a point represents a move that allows escape, points adjoining the outside perimeter may be determined to allow escape if a move is made on that point, and points adjoining points that have already [been assessed as] escaped may be determined to allow escape if a move is made on that point.

In other words, the process of S220 involves first determining the E points of the points (x, y) for all of the points (x, y) for which Area [x] [y], which is the assessment area, equals 1. The points for which E [x'] [y']=1 and H [x'] [y']=0 are also determined.

An assessment is then made for each of the points (x', y') that satisfy these conditions as to whether Board [x'] [y'] ≠tn^3; i.e., as to whether Board [x'] [y'] represents stones of the opponent's color (S2300).

If such is not the case, the points (x, y) are added to the array D (S2310). The process is then executed for the next E points of the points (x, y) for which E [x] [y]=1 and H [x'] [y']=0.

Meanwhile, in cases in S2300 where the Board [x'] [y']=tn^3, the process is then executed for the next E points of the points (x, y) for which E [x] [y]=1 and H [x'] [y']=0.

The aforementioned process is executed for all of the E points of the points (x, y) such that E [x] [y]=1 and H [x'] [y']=0.

An assessment is then made as to whether the stones of the points (x', y') have escaped for all of the E points of the points (x, y) for which E [x'] [y']=1 (S2320). When [the stones] have escaped, the stones within the assessment area are in a state of connection (a state in which connection is possible) to the outside perimeter. An assessment of "alive" is made in oases where the target stones can be assessed as escaped.

In cases where [the stones] have not escaped, the process of S2320 is executed for the next E points of the points (x, y) for which E [x'] [y']=1. Meanwhile, in cases where [the stones] have escaped, the points (x, y) are added to the array D (S2330), and the process is executed for the next points (x, y) for which Area [x] [y]=1.

The aforementioned processes are executed on all of the points (x, y) for which Area [x] [y]1, whereby the points that represent moves that allow escape are determined, and a process for assigning those points to the array D, i.e., the process of S2200, can be executed.

Executing the process of S2200 as above allows points representing moves that allow escape to be determined. The second processing unit 211 assesses whether connection is possible between any of the points P1 within the array D and the points p at which moves can be made (S2210). In other words, an assessment is made as to whether connection to the outside perimeter is possible.

The processes below are executed by the second processing unit 211, whereby an assessment can be made as to whether given points $P_A$ and $P_B$ can connect.

An assessment is first made as to whether a stone played daring turn tn will connect the $P_A$ and the point $P_B$ horizontally or vertically (S300). An assessment of possible connection is made in cases of connection. Meanwhile, in cases of no connection, an assessment is made as to whether points at which moves could be made are present within the assessment area (S310). An assessment of connection not being possible is made in oases where points at which moves could be made are not present.

In cases where points at which moves could be made are present in the assessment area, [stones of] the color (tn^3) different from the color of the turn tn at point P1 are played at point $P_1$ for points at which tn^3 could me played at (S320). [The turn] tn is then played at point $P_2$ at which stones of the same color as that of the turn tn could be played (S330). An assessment is then made as to whether the points $P_A$, $P_B$ are horizontally or vertically connected in the state after the moves of S320, S330 (S340). When there is no connection, [a stone of] the same color as in the turn tn at point $P_2$ is played at a point different from previously played stones (S330), and the assessment process of S340 is once again performed.

This process is executed for all of the points $P_2$ at which moves could be made. In cases where the assessment of S340 is that connection is not possible for all points, the ultimate assessment is that connection is not possible.

Meanwhile, in cases where any of the points $P_2$ at which moves could be made can be assessed as allowing connection in the assessment of S340, the process is executed for the next move of the next point $P_1$. In cases where connection is assessed as possible at the points $P_1$ at which moves could be made, the ultimate assessment is that connection is possible.

The processes above are executed by the second processing unit 211, whereby an assessment in made S2210 as to whether connection is possible between any of the points $P_1$ in the array D and the points p at which moves could be made.

In cases where an assessment of possible connection could not be made in S2210, an assessment is made that escape is not possible, and processing results to that effect are returned.

Meanwhile, in cases where an assessment of possible connection were made in S2210, an assessment is made as to whether the points p are target stones (S2230), and in cases where [the points p] are target stones, an assessment of "alive" is made, and results to that effect are returned (S2240). Meanwhile, in cases where the points p are assessed as not being target stones, the group of points p are considered as escaped, and processing results to that effect are returned (S2250).

After executing the process for assessing escape of the target stones in S2100 as above, the assessment ends in cases where the target stones have escaped or have been assessed as alive (S2110). The target stones are then assessed as alive.

Meanwhile, in cases where the target stones are assessed as not being capable of escape, an assessment is made as to whether the assessment area and the outside perimeter have changed during the process for assessing escape of the target stones in S2100 (S2120). In cases where a change has occurred (S2130), the process of S2100 is executed again.

The processes of S2210 through S2250 are executed as above, whereby the life-and-death assessment can be performed even when the outside perimeter includes two colors.

Meanwhile, in cases where a change has not occurred (S2130), the second processing unit 211 executes the normal process for assessing life and death on the assessment area revised by the first processing unit 210 (S2140). In other words, the assessment process is executed using a brute-force approach or an approach in which a portion [of points] are left out.

In cases where an assessment is possible as a result of the normal life-and-death assessment (S2150), the assessment results for the life and death of the target stones are calculated, and the process for assessing life and death is ended. Meanwhile, in cases where an assessment is not possible as a result of the normal life-and-death assessment of S2140 (S2150), assessment results indicating that assessment is not possible are returned.

The second processing unit 211 can execute the process for assessing life and death in S2020 as above for the points p played at in [the turn] tn'.

In cases where the target stones can be assessed as alive as a result of the process for assessing life and death (S2040), the move at the point p is moved back one step (S2050), the process for assessing life and death is ended, and processing results of "alive" are outputted by the output unit 22 as the ultimate results.

Meanwhile, in cases where the target stones could not be assessed as alive or dead as a result of the process for assessing life and death (i.e., in cases of "not possible") (S2040), tn'^3 is assigned to tn' (S2060). A recursive process is then executed on the process for assessing life and death in S200 (S2070).

In cases where the target stones can be assessed as alive as a result of the recursive process of S2070, the move at the point p is moved back one step (S2050), the process for assessing life and death is ended, and processing results of "alive" are outputted by the output unit 22 as the ultimate results. Meanwhile, in cases where the target stones could be assessed as dead, [the turn] tn' and the points p are returned to the initial state of the loop (S2090). In order to return the variables of the tn' and the points p to the initial state of the loop, the initial state of the values thereof is stored as some type of temporary variable. In cases of returning in S2090, these temporary variables may be called and the values assigned.

After the process of S2090, moves are played on the points p at which moves could be played in [the turn] tn' (S2020), and the processes of S2020, S2030, S2040, S2050, S2060, S2070, S2080, and S2090 are repeated. In cases where the aforedescribed processes have been executed for all of the points at which moves could be played in [the turn] tn', the target stones are assessed as being dead.

Meanwhile, in cases where the color of the player of the current turn and the color of the target stones do not match in S2010, processes are executed as in S2020 through S20990. However, for the results of the process for assessing life and death, instead of S2040, S2080, in cases where the life and death of the target stones has been assessed as dead (S2045), the move at the point p is moved back one step (S2055), the process for assessing life and death is ended, and processing results of "alive" are outputted by the output unit 22 as the ultimate results.

Meanwhile, in cases where the target stones were assessed as alive as a result of the process for assessing life and death (S2045), [the turn] tn' and the points p are returned to the initial state of the loop (S2095).

The process for assessing life and death is executed as above by the second processing unit 211, whereby the assessment of the life and death of the target stones is executed. The process for assessing life and death was bifurcated according to whether or not the color of [the turn] tn' and the color of the target stones matched, but this choice was made for the sake of understandability, and the processes may also be performed together.

The results of the assessment of the life and death of the target stones are outputted by the output unit 22 (S220). In other words, the output unit 22 transmits the processing results representing the results of the life-and-death assessment to the player terminal 3. The player views the screen and can thereby learn the results of the life-and-death assessment.

INDUSTRIAL APPLICABILITY

Using the system 1 for assessing life and death in a game of Go of the aforedescribed present invention allows life-and-death assessments to be made even in cases where both black and white stones are included in the outside perimeter or in cases where the outside perimeter is present at two locations. The number of cases in which life-and-death assessments can be performed is therefore greater than in the prior art.

KEY

1 Life-and-death assessing system
2 Server
3 Player terminal
10 Computational device
11 Storage device
12 Display device
13 Input device
14 Communication device
20 Input-receiving unit
21 Assessment unit
22 Output unit
210 First processing unit
211 Second processing unit

The invention claimed is:

1. A computer system for assessing life and death in a game of Go, the system for assessing life and death characterized in being provided with:
   (a) an input-receiving unit configured to run under control of a CPU of the computer system for receiving information concerning a board of Go-game, including player turns, an assessment area designated by a player, stones in the assessment area to be assessed including target stones constituting some or all of the stones to be assessed, from a storage device of a playing system;
   (b) an assessment unit configured to run under control of a CPU of the computer system for assessing, after the assessment area has been revised by being expanded, whether a group of said target stones is alive or dead; and
   (c) an output unit configured to run under control of a CPU of the computer system for outputting a result of a life and death assessment in the assessment unit, (d) wherein the assessment unit performs functions including:
(e) expanding the assessment area, where an outside perimeter of an outside perimeter area has an end stone on a line second or third from a board edge, by extending the outside perimeter by positioning on the foregoing line, in adjoining fashion to the end stone, a number of stones of the same color as the outside perimeter so as to be connected to the stones of the outside perimeter, said number of stones corresponding to a number of lines between said end stone and the board edge, where the foregoing stones are necessary to convert part of the outside perimeter area, on the first or second line from the board edge, to an additional portion of the assessment area, thereby revising the assessment area; and
(f) performing, when a group of stones in the revised assessment area has escaped, an assessment of said group of stones as being alive in cases where said group of stones is a group of said target stones, or, in cases where said group of stones is not a group of said target stones, executing a process for assessing life and death in which a condition is added that said group of target stones connected to said group of stones is alive while considering said group of stones as being uncapturable.

2. The system for assessing life and death in a game of Go according to claim 1, characterized in that:
upon expanding the assessment area according to paragraph (e) of claim 1, in the case in which an outside perimeter area becomes enclosed by the revised assessment area, the assessment unit designates the foregoing outside perimeter area as part of the assessment area.

* * * * *